(12) United States Patent
Edeker et al.

(10) Patent No.: US 7,269,632 B2
(45) Date of Patent: Sep. 11, 2007

(54) NETWORKED COMPUTER SYSTEM FOR COMMUNICATING AND OPERATING IN A VIRTUAL REALITY ENVIRONMENT

(75) Inventors: Ada Mae Edeker, Earlville, IL (US); Anatoly P. Syomik, Kiev (UA); Alex Siyanko, Kiev (UA)

(73) Assignee: XDYNE, Inc., Earlville, IL (US)

( * ) Notice: Subject to any disclaimer, the term of this patent is extended or adjusted under 35 U.S.C. 154(b) by 626 days.

(21) Appl. No.: 09/874,022

(22) Filed: Jun. 5, 2001

(65) Prior Publication Data
US 2002/0188678 A1 Dec. 12, 2002

(51) Int. Cl.
*G06F 15/16* (2006.01)
(52) U.S. Cl. ............... 709/217; 709/219; 709/227; 709/201
(58) Field of Classification Search ........ 709/200, 709/204, 201, 217, 227, 219
See application file for complete search history.

(56) References Cited

U.S. PATENT DOCUMENTS

| | | | |
|---|---|---|---|
| 5,276,785 A | 1/1994 | Mackinlay et al. | |
| 5,301,284 A | 4/1994 | Estes et al. | |
| 5,362,239 A | 11/1994 | Pfuetze | |
| 5,675,746 A * | 10/1997 | Marshall | 705/35 |
| 5,767,855 A | 6/1998 | Bardon et al. | |
| 5,808,614 A | 9/1998 | Nagahara et al. | |
| 5,821,925 A | 10/1998 | Carey et al. | |
| 5,826,266 A | 10/1998 | Honda | |
| 5,835,094 A | 11/1998 | Ermel et al. | |
| 5,880,733 A | 3/1999 | Horvitz et al. | |
| 5,884,029 A * | 3/1999 | Brush et al. | 709/202 |
| 5,889,951 A | 3/1999 | Lombardi | |
| 5,900,879 A | 5/1999 | Berry et al. | |
| 5,903,271 A | 5/1999 | Bardon et al. | |
| 5,911,045 A | 6/1999 | Leyba et al. | |
| 5,923,324 A | 7/1999 | Berry et al. | |
| 5,926,179 A | 7/1999 | Matsuda et al. | |
| 5,956,038 A | 9/1999 | Rekimoto | |
| 5,958,012 A | 9/1999 | Battat et al. | |
| 5,973,697 A | 10/1999 | Berry et al. | |
| 5,982,372 A | 11/1999 | Brush, II et al. | |
| 5,999,208 A | 12/1999 | McNerney et al. | |
| 5,999,944 A * | 12/1999 | Lipkin | 707/104.1 |
| 6,012,072 A | 1/2000 | Lucas et al. | |
| 6,014,145 A | 1/2000 | Bardon et al. | |

(Continued)

OTHER PUBLICATIONS

Groove Product Backgrounder (white paper, datasheet and groove brief) written by Groove Networks, Inc. published in 2001.

(Continued)

*Primary Examiner*—Rupal Dharia
*Assistant Examiner*—Kristie D. Shingles
(74) *Attorney, Agent, or Firm*—Patents +TMS, P.C.

(57) ABSTRACT

The present invention relates to interactive virtual reality networked computer systems and methods that facilitate communication and operation in a virtual reality environment. The virtual reality networked computer system has an infrastructure that includes a number of users, hosts and servers. The interconnected hosts and servers allow users to effectively locate, activate, access and interact within virtual reality environments in a variety of different ways. For example, users can establish user groups such that interaction within the virtual reality environment occurs between hosts (accessed by users) without the need of a central or dedicated server.

29 Claims, 21 Drawing Sheets

U.S. PATENT DOCUMENTS

| | | |
|---|---|---|
| 6,023,270 A | 2/2000 | Brush, II et al. |
| 6,025,839 A | 2/2000 | Schell et al. |
| 6,026,376 A | 2/2000 | Kenney |
| 6,052,123 A | 4/2000 | Lection et al. |
| 6,057,856 A | 5/2000 | Miyashita et al. |
| 6,058,397 A * | 5/2000 | Barrus et al. ............ 707/104.1 |
| 6,064,389 A | 5/2000 | Berry et al. |
| 6,081,270 A | 6/2000 | Berry et al. |
| 6,081,271 A | 6/2000 | Bardon et al. |
| 6,085,256 A | 7/2000 | Kitano et al. |
| 6,088,032 A | 7/2000 | Mackinlay |
| 6,094,196 A | 7/2000 | Berry et al. |
| 6,119,147 A | 9/2000 | Toomey et al. |
| 6,154,211 A * | 11/2000 | Kamachi et al. ............ 345/419 |
| 6,167,433 A * | 12/2000 | Maples et al. ............ 709/204 |
| 6,271,843 B1 * | 8/2001 | Lection et al. ............ 715/848 |
| 6,289,380 B1 | 9/2001 | Battat et al. |
| 6,349,301 B1 * | 2/2002 | Mitchell et al. ............ 707/101 |
| 6,377,263 B1 | 4/2002 | Falacara et al. |
| 6,381,583 B1 | 4/2002 | Kenney |
| 6,386,985 B1 | 5/2002 | Rackham |
| 6,476,830 B1 | 11/2002 | Farmer et al. |
| 6,496,207 B1 * | 12/2002 | Matsuda et al. ............ 715/848 |
| 6,798,407 B1 * | 9/2004 | Benman .................... 345/419 |
| 6,912,565 B1 * | 6/2005 | Powers et al. ............ 709/205 |
| 2002/0002491 A1 * | 1/2002 | Whitfield .................... 705/14 |
| 2002/0128952 A1 * | 9/2002 | Melkomian et al. .......... 705/37 |
| 2003/0207237 A1 * | 11/2003 | Glezerman ................ 434/118 |

OTHER PUBLICATIONS

Abode Atmosphere (1.0 Browser User Guide) written by Abode Systems Incorporated published in 2001.

Virtual Worlds Platform 5—Product Specification written by blaxxum interactive published in 2001.

The Architecture of a Distributed Virtual Worlds System written by Microsoft Corporation published in 2000.

Dive: A scaleable network architecture for distributed virtual environments written by www.sics.se/emmanuel/publications/dsej/dsej.html published in Sep. 1998 (printed Oct. 11, 2001).

Distributed Virtual Reality—An Overview written by www.ece.uwaterloo.ca/~broehl/distrib.html published Jun. 1995 (printed Oct. 11, 2001).

Overview of Activeworlds written by www.activeworlds.com/overview.asp (Activeworlds Corp.) published in 1997-2001 (printed Oct. 11, 2001).

The 3D Entertainment written by www.worlds.com/3dcd/3dcdtech.html published date unknown (printed Oct. 11, 2001).

* cited by examiner

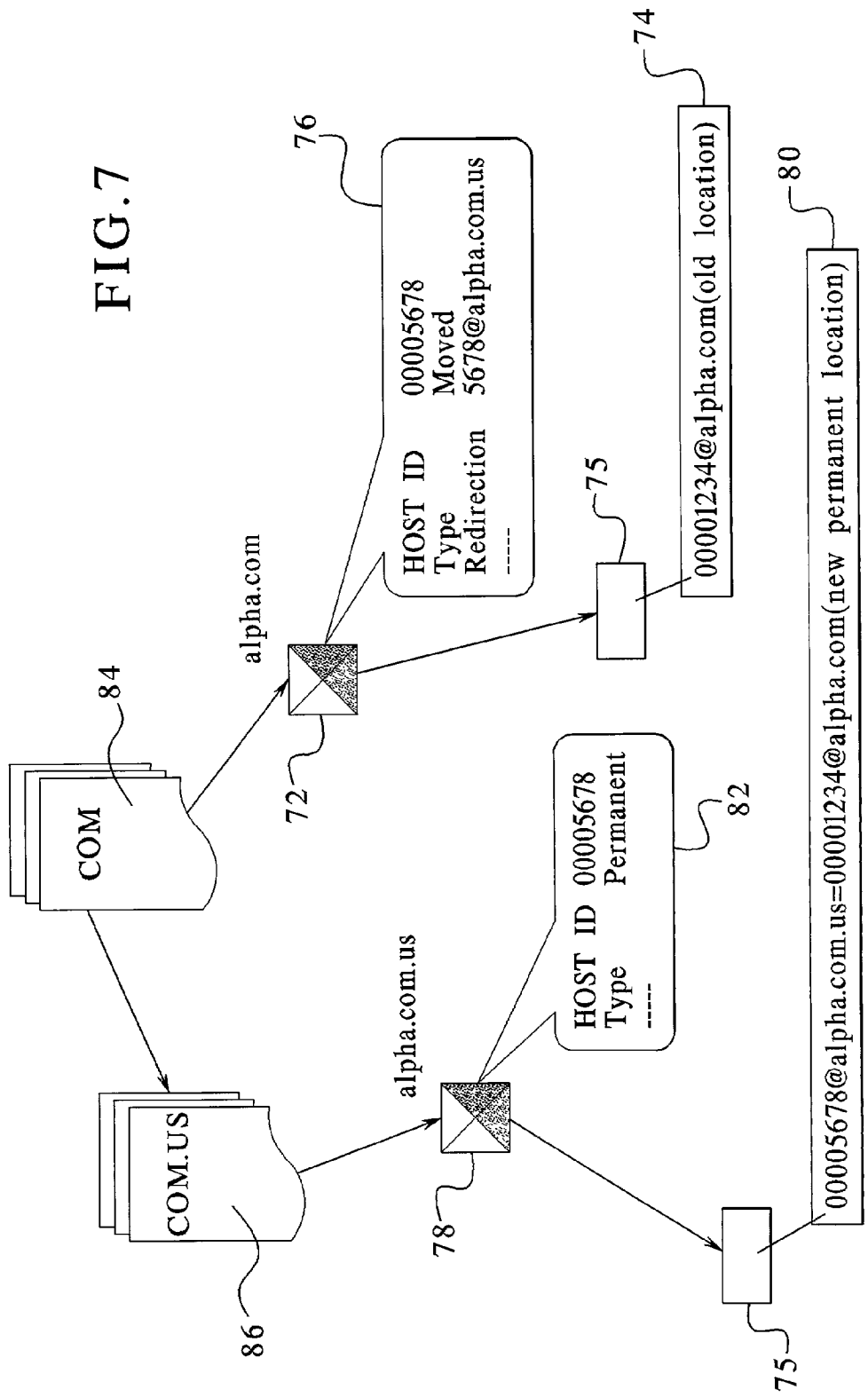

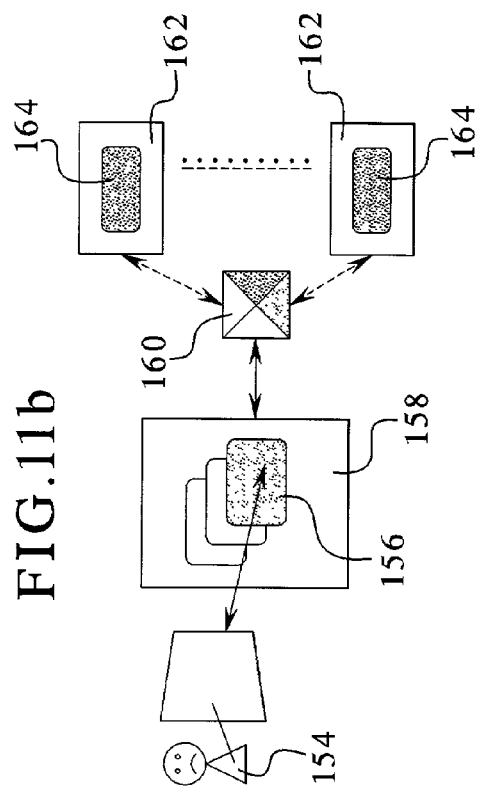
FIG.11b
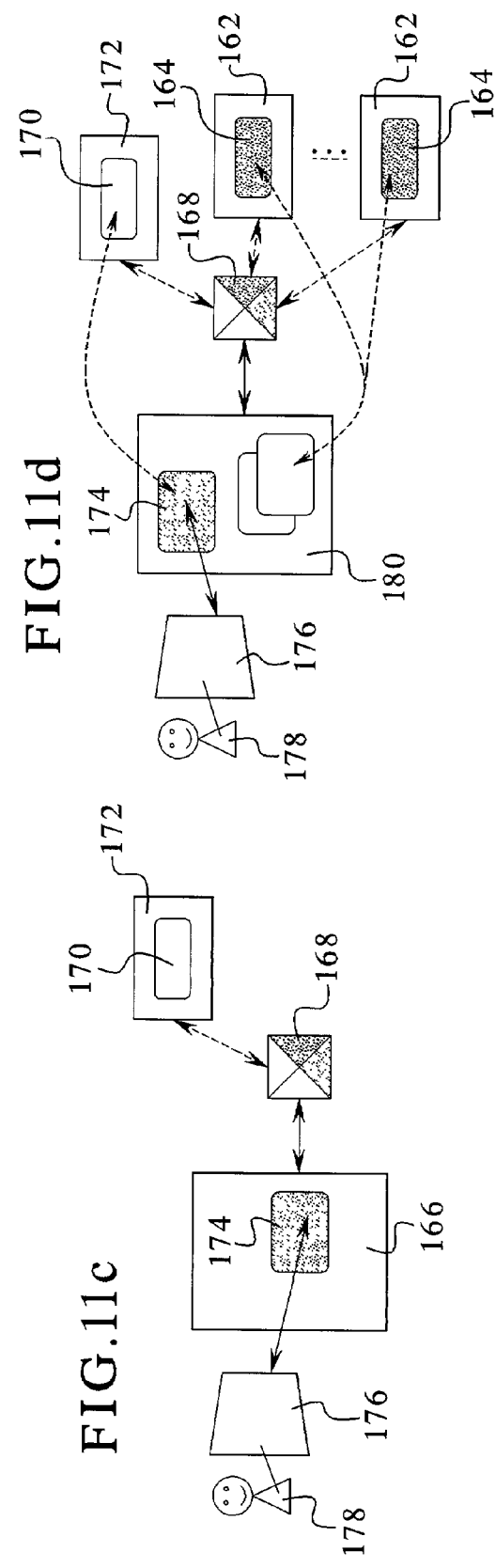
FIG.11d
FIG.11a
FIG.11c
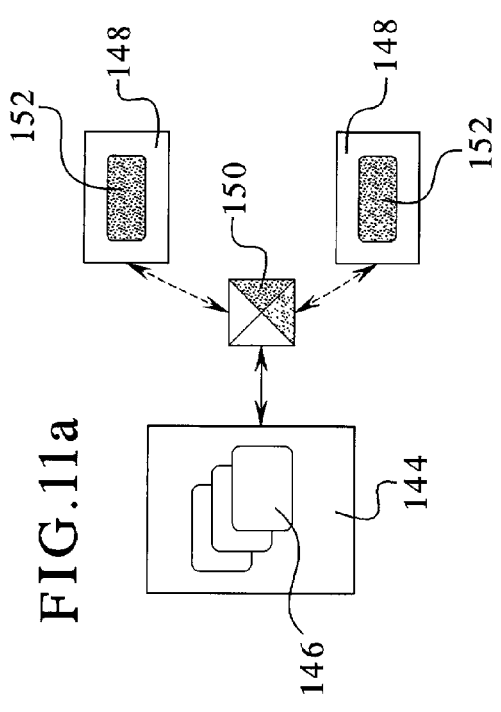

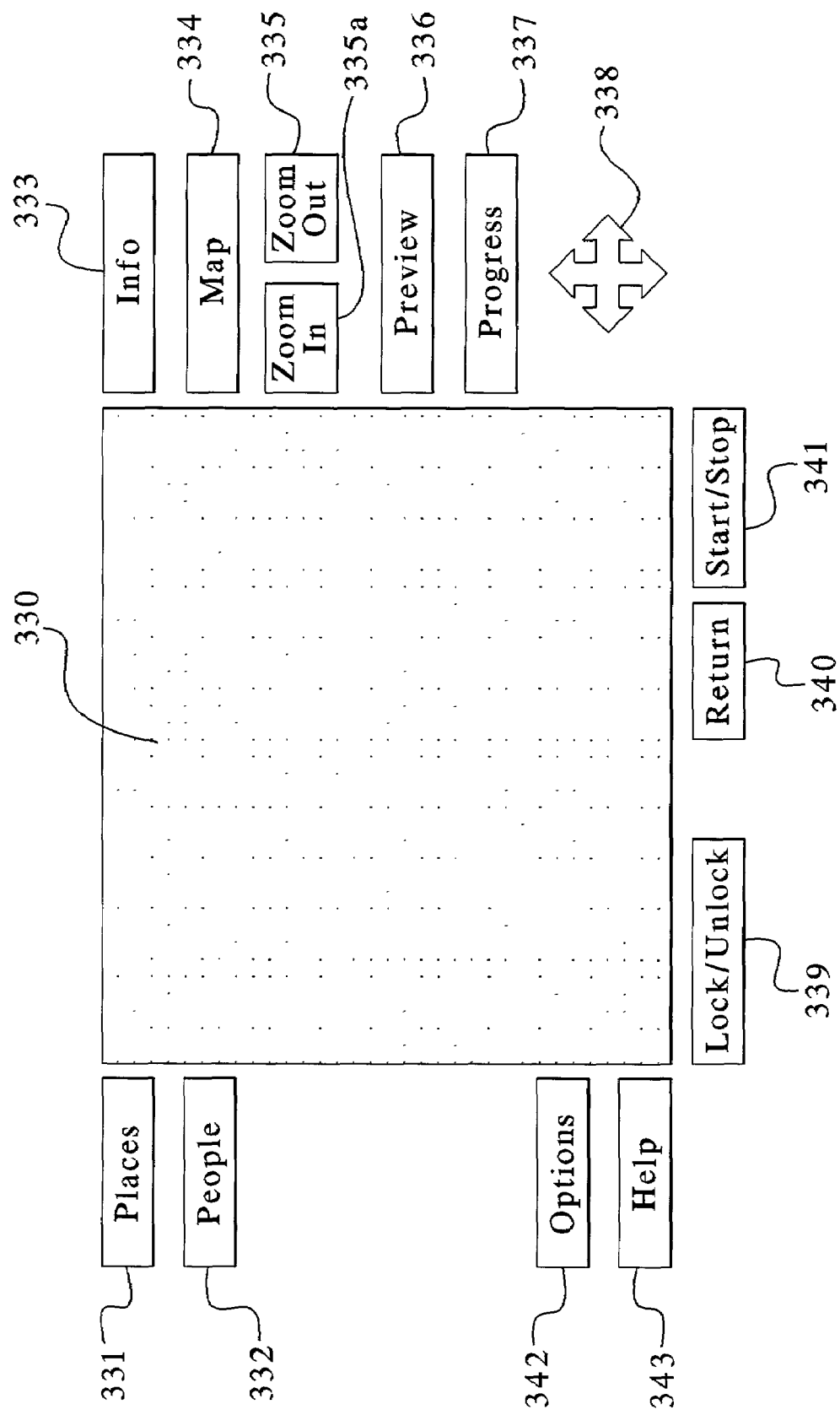

FIG.18D
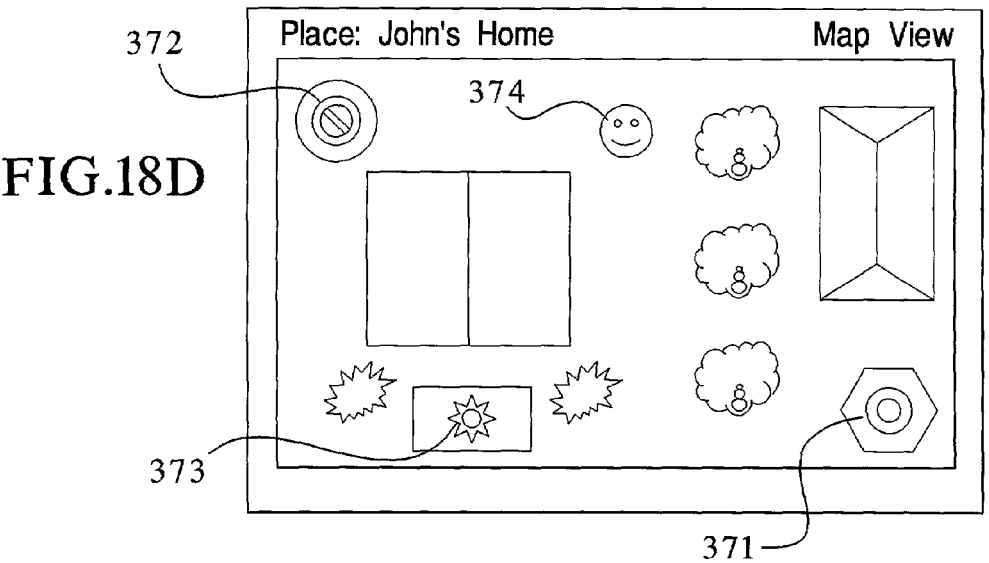
FIG.18E
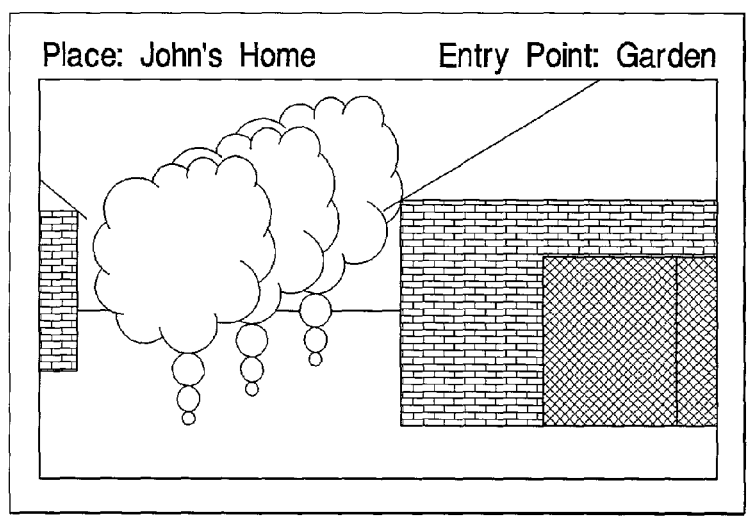
FIG.18F
Destination: John's Home
Status: Started
Progress: 62%
Time to Destination: 12 sec
User Group Teleportation Progress:
| User | Progress Status | ... |
|---|---|---|
| Alex | 62% | |
| Bob | 74% | |
| Kathy | 86% | |
| | | |
| | | |

- - - - - - → Host page search request
――――→ Session servers send page search result data
―――――→ Name servers respond to host page search request with a list of child servers for subsequent search

NETWORKED COMPUTER SYSTEM FOR COMMUNICATING AND OPERATING IN A VIRTUAL REALITY ENVIRONMENT

The present invention generally relates to interactive networked computer systems, and in particular to networked computer systems which enable a plurality of users to communicate and operate within the same virtual reality environment.

BACKGROUND OF THE INVENTION

In recent years, virtual reality technology has been generally known and utilized to implement computer interfaces for certain computer software applications such as computer games and other Internet and World Wide Web applications. However, there exists a continuing need to provide users with integrated, interactive, easy-to-use, creative and highly personalized virtual reality computer environments which may be utilized as high-level user interfaces for various personal, business and collaborative tasks.

To address this problem, the computer software industry is developing virtual reality computer programs that provide virtual reality environments which can be shared by a number of users. Known examples of such programs include Internet-based virtual reality network games and public chat portals which are typically provided from a remote dedicated virtual reality server accessible from the user or client computers via the Internet global communication network. The interactions between remote server and client computers are carried out by TCP/IP protocol. Under this protocol, the client computers have the required and appropriate client software installed and running before they interact or communicate with the server. In general, all static data for providing the virtual environment is stored locally on the client computer. The locally stored data includes, for example, graphics, three dimensional object models and the client software. Such data architecture enables a relatively large number of participants to act and communicate simultaneously in a virtual reality environment since the amount of data transferred over the Internet during network sessions is significantly reduced. However, the centralized hosting model significantly restricts the user's possible actions within such virtual environments because such publicly hosted virtual environments cannot be effectively modified by users according to their personal and specific needs.

The success of virtual reality technology also has impacted change on the World Wide Web ("Web") which is a widely used communication and information resource network that is built on or over the Internet infrastructure. Users access the Web with the assistance of software programs, usually called Web browsers, which in turn communicate with remotely hosted Web server software by high level HTTP communication protocol. This protocol uses Internet TCP/IP as an underlying transport protocol.

The Web includes conventional web sites such as flat or two-dimensional pages containing text and pictures as provided by Web browsers, and a growing number of virtual reality capable Web sites (also known as Virtual Worlds). Such virtual reality environments are typically described by Virtual Reality Markup Language ("VRML"). VRML data files are stored at Web servers and then downloaded and interpreted by Web browsers similar to regular HTML documents. Additional functionality for VRML environments, as is the case with HTML, is provided by Web browser scripting capabilities. The disadvantages of such Web-based virtual reality environments are, for example, the stateless model, relatively low graphic quality and the lack of interactivity due to certain restrictions of known Web technology.

For example, certain Virtual World data is stored remotely and generally must be downloaded to a client computer each time a user accesses a web server. The amount of such data cannot be substantial due to the typically low speed of data transfer over the Internet. This significantly restricts graphics quality, since graphic textures are required to remain small and simple in order to be effectively compressed and transmitted. The same is true for other data components of Virtual Worlds such as VRML files and supporting scripts.

In addition, users have no ability to modify such Virtual World environments in a persistent or consistent manner since all changes are usually restricted to a session scope and not stored permanently. As a result, Virtual Worlds on the Web, in most cases, are relatively small and have poor functionality, and therefore are not being optimally utilized. Existing Virtual Worlds on the Web cannot represent or reflect the reality of changes to an environment.

Known virtual reality technology has also gained popularity in other computer software applications such as organizing user data. Several computer software applications such as virtual desktop extenders and virtual desktops are commercially available. These applications utilize 3D environments to store and manage user files and programs. Such desktops are implemented as graphic shells over an underlying file system and typically provide computer file resources within some predefined 3D virtual workspace. They can also allow an "in-place" preview of selected World Wide Web contents without leaving the 3D environment, such as launching a stand-alone Web browser application. Unlike the previously discussed Internet-based applications (i.e., publicly shared virtual reality environments) virtual desktops represent a class of personal, locally stored and hosted virtual reality environments which do not provide user-to-user interaction within a public virtual reality environment.

Known planning and design programs also utilize virtual reality interfaces, for example, for interior as well as landscape planning and design. However, their functionality is generally limited to navigation and controlling movement/ predesignated graphics viewed on a computer screen.

A problem with implementing networked virtual reality computer environments relates to the existing communication methods between online users in the virtual reality environments. Known multi-user virtual reality communication applications use publicly shared three-dimensional environments as a communication media and are traditionally implemented on a client-server platform. Within this architectural framework, virtual environments are hosted on a dedicated central server wherein users access and connect to the server as clients and represent themselves within the environment as animated characters or avatars. An example of such a network is disclosed in U.S. Pat. No. 5,956,038.

Communication between users within such environments requires the corresponding central virtual reality server to be up and running and to have sufficient capacity to handle such communications. Moreover, for security reasons, users typically have restricted access rights to remotely hosted virtual environments wherein the session participants do not have complete control over the access rights, such as rights to add or remove objects, run applications or other like access rights. For example, in existing public chat portals, typical actions are restricted to user avatar movements and chat function. This significantly restricts user capability to share visual and other information during a communication session since the content and functionality of centrally hosted virtual reality environments is not capable of providing all possible needs or goals of each particular session.

Another problem with existing networked virtual computer environments relates to data traffic limitations in publicly shared virtual reality environments. When utilizing a conventional dedicated central server, there is a limit to the number of users that can concurrently access the server. This limit exists both for the server and the clients and in part depends on the network connection bandwidth. The amount of data transferred between the server and a particular client is also proportional to the number of all connected clients. For the server, this amount is proportional to the square of this number. As the number of users increases, the rate of data transmission can be effectively decreased. In addition, an increased number of users can also result in a situation where new users may not be able to access the shared or public virtual environment.

In many cases, however, users access the public virtual reality environments to only communicate with other known users, for example, users on a personal contact list. In addition, certain users access public virtual reality environments to perform certain personal tasks and not to communicate with other users. For example, users can visit a number of public virtual environments, such as virtual shops, libraries or the like, analogous to how users can visit different Internet locations during conventional Web page browsing.

A further problem with existing networked virtual reality environments relates to how users can move from one virtual reality environment to the next. The process of user transition from one virtual reality environment to another is referred to as a "teleportation." In general, this process is implemented by utilizing hyperlinks, destination lists and direct user input. During teleportation, the user typically remains idle and, in fact, beyond connection to any virtual environment. In other words, teleportation, as generally known and used, does not provide continuous networked communication. In addition, known teleportation may require substantial time depending on the network connection bandwidth and the amount of data to be transferred to a client computer. Moreover, teleportation is typically applied to one particular user at a time, that is, it does not support joint and synchronous transition of several users from one virtual environment to another.

The present invention recognizes the above-described problems and the overall need to provide users with an integrated, easy-to-use, creative and highly personalized virtual reality computer environment and accordingly recognizes a need for a virtual reality computer environment with the capabilities, for example, to effectively represent and manage computer informational resources, to establish interactive network communication and to simulate and control external environments.

SUMMARY OF THE INVENTION

The present invention solves the above problems by providing networked computer systems that facilitate communication and operation in a virtual reality environment. The virtual reality environment provides three dimensional objects to work and operate computer files and applications in place of two dimensional icons associated with conventional two dimensional graphical user interfaces. By utilizing objects, a user and in particular an inexperienced user, can more easily and understandably operate a computer to, for example, communicate with other users.

The virtual reality environment can include a variety of different environments that each contain a number of different objects. For example, one virtual reality environment provided by the present invention includes a virtual reality home environment. The user can create, customize and use (to a certain extent) objects for its virtual reality home environment in a similar manner that the user creates, customizes and uses such object in the user's everyday home environment. These objects are recognizable and familiar to the user which facilitates ease of operation within the virtual reality environment. For instance, if a user wants to turn on a light in the environment, the user moves the light switch on a wall in the virtual reality home environment from the "off" position to the "on" position. Moreover, these objects associated with the virtual home environment can be remotely utilized to control and operate a variety of objects of an actual home environment, such as a thermostat, lights, electric appliances and other like devices.

By utilizing the virtual reality environment of the present invention, such as the virtual reality home environment, users can share the same virtual reality environment and can effectively communicate and interact with one another to the extent that it appears or feels as if they were actually meeting in person or in the same room or other physical location provided by the virtual reality environment. For example, other users of the environment can visit a certain user's home environment to interact by, for example, conversing, playing a game, listening to music, or other like communication medium.

To effectively operate and communicate within a virtual reality environment, the present invention includes a computer network infrastructure. The network infrastructure preferably includes a number of interconnected hosts and servers. Each host can include one or more virtual reality environments which users can locate and access through servers connected to or communicating with the hosts. The hosts and their users are preferably located via the servers by a number of different operations, such as through the visit user home mode and follow user mode described below. Certain servers also function to regulate and control communication or network traffic between hosts. This can be done, for example, by uni-cast messaging and multi-cast messaging as described below.

Once the host is located and accessed, the virtual reality environment(s) associated with the host can be run in an active mode and/or a passive mode. In the active mode, server host and connected client hosts are in continuous network connection with one another. This enables server hosts to control and update any changes that are made to the virtual reality environment associated with these hosts. In the passive mode, network connection between server host and connected client hosts is terminated once a copy of the virtual reality environment is transmitted to a client. This enables users to create independent user groups for sharing different and independent copies of a virtual reality environment. By providing such groups, the amount of transmitted data and the network space over which the data is transmitted is effectively minimized. The virtual reality environment can be shared by the users associated with a user group independent of a dedicated server. This enhances communication and operation in the virtual reality environment by, for example, increasing interactivity, graphics, and the rate at which data is transmitted.

The networked virtual reality environment of the present invention can also be utilized to provide teleportation for a user or a group of users including continuous network communication. This facilitates communication and interaction between users when performing certain collaborative tasks or for gaining immediate access to particular virtual environments. Examples of such continuous group travel scenarios include, but are not limited to, virtual guided tours or group access to restricted virtual environments under the control of an authorized person.

It is therefore an advantage of the present invention to provide virtual reality computer networked systems to facilitate communication and operation within a virtual reality environment.

Other objects, features and advantages of the present invention will be apparent from the following detailed disclosure, taken in conjunction with the accompanying sheets of drawings, wherein like numerals refer to like parts, components, processes and steps.

BRIEF DESCRIPTION OF THE DRAWINGS

FIG. 7 is a diagrammatic representation illustrating host name aliasing operations of one embodiment of the present invention;

FIGS. 11a, 11b, 11c and 11d are diagrammatic representations illustrating examples of network communication sessions between hosts in active mode;

FIG. 17 is a diagrammatic representation illustrating a teleportation control panel;

FIGS. 18a, 18b, 18c, 18d, 18e and 18f are diagrammatic representations illustrating a variety of teleportation control panel displays;

DETAILED DESCRIPTION OF THE INVENTION

The present invention provides networked computer systems that facilitate communication and operation within a virtual reality environment. The virtual reality environment replaces two dimensional icons, such those associated with conventional two dimensional graphical user interfaces, with three dimensional objects to work and operate computer files and applications. By utilizing three dimensional objects, a user and particularly an inexperienced computer user, can more easily and understandably use and operate a computer to communicate with other users and perform other tasks.

It should be appreciated that the virtual reality environment of the present invention can include a variety of different environments that each have a number of different objects. For example, one virtual reality environment of the present invention includes a home environment. The user can create, customize and use its virtual reality home environment in a similar manner that it can change the surroundings in the user's home. The customized virtual reality home environment is more recognizable and familiar to the user than a conventional two dimensional graphical user interface. This facilitates the user's ability to use and operate a computer.

By utilizing one of the virtual reality environments adapted to be provided by the present invention, such as the home environment, users can share the same virtual reality environment and can effectively communicate and interact with one another to the extent that it is as if they were actually meeting in person. For example, users can visit a certain user's home environment to interact by, for example, conversing, playing a game, performing collaborative work, listening to music or other like communication medium. It should be appreciated that while a home environment is used herein to describe the present invention, the present invention is adapted to provide any environment such as a work or office environment, an exercise or sports environment, a meeting environment, learning environments such as classrooms, libraries and laboratories, shopping environments such as virtual shopping malls and entertainment or gaming environments such as virtual attractions, amusement parks and virtual reality games.

Figure 1:
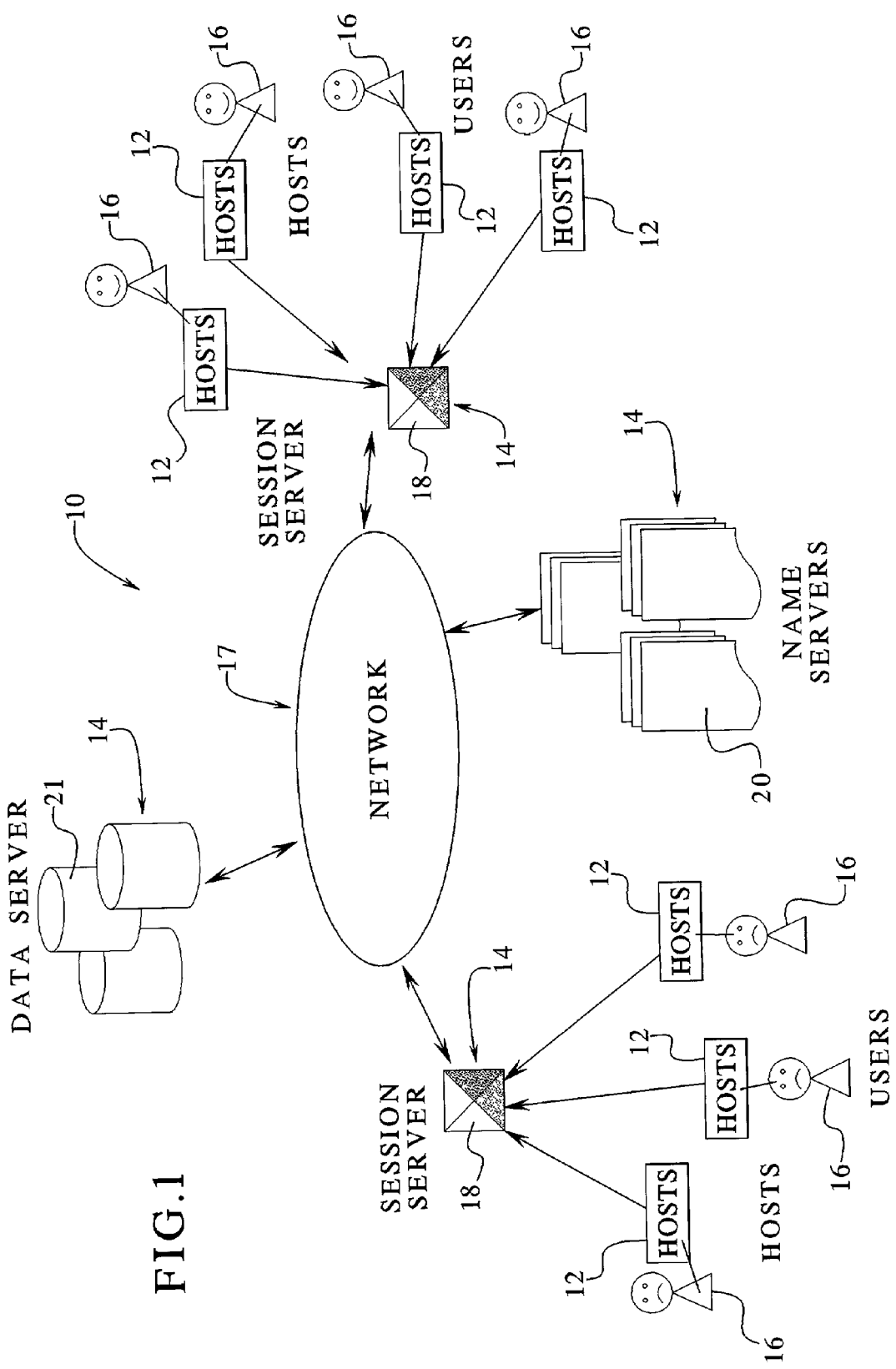
FIG. 1 is a diagrammatic representation illustrating the virtual reality environment network infrastructure of one embodiment of the present invention.

Referring now to the Figures, to facilitate effective communication and operation within a virtual reality environment, such as a home environment, one embodiment of the present invention provides a networked computer system or a computer network architecture or infrastructure 10 generally illustrated in FIG. 1. This infrastructure 10 includes a variety of different components such as hosts 12 and servers 14 that provide users 16 with the ability to locate, access, activate and operate within virtual reality environments associated with the hosts 12. Various components of this embodiment of the network infrastructure of the present invention are discussed below.

A central component of the infrastructure are the hosts 12. In one embodiment of the present invention, such host 12 is a computer (discussed in greater detail below) adapted to run the application(s), module(s), program(s) or other suitable software for enabling the host to operate in a virtual reality environment. Users 16 respectively access hosts 12 to function and operate within the virtual reality environment and to communicate with other users 16 via the network 17. A user 16 can access a host either locally at that host (i.e., local user) or remotely through another host (i.e., remote user). A local user generally includes a user who accesses or logs into a local host and physically operates the local host computer. A remote user includes a user who accesses a remote host and physically operates the remote host to establish network communication sessions with a local host. It should be appreciated that a user 16 generally includes a person or a computer program that functions within the virtual reality environment associated with a certain host or hosts.

In order to facilitate network connections between hosts, the hosts are uniquely identified by a registration process. During the registration process, the host is assigned a unique identifier, such as a host identifier ("host ID"). With a unique identifier, the host can be easily located within the networked computer system of the present invention.

The host is assigned its host identifier by a session server 18 (i.e., a home session server) which stores this information along with other informational data associated with that host. For example, the home session server also includes information relating to the owner of the host, such as the owner identification ("owner ID"). Each registered host in the system of the present invention has an owner, namely a registered user of the system.

The registered user, like the registered host, has a unique identifier, such as a user identifier ("user ID"). The user ID information is also stored by the respective home session server 18. If the host ID is the same as the owner ID for a particular host, the host is referred to as a primary host of the registered user. However, users can own additional or secondary hosts.

The present invention preferably enables a host owner to implement access restrictions to limit and control access of its host. The access restrictions can be applied in any suitable way, such as to hosted virtual reality environments, particular areas within such environments, available operations over objects or classes of objects, access time for certain users and categories, groups or lists of users and other hosts who have access rights to the host.

For example, the access restrictions can prevent anonymous users (i.e., those users who have logged onto the network with a user ID that corresponds to a special "anonymous" value from accessing the owner's host or any virtual reality environment in such host. Access restrictions can be further utilized to specify how to access a host (i.e., local or remote access) and to designate certain remote hosts from which a user(s) can only access the owner's host. Although the owner of a host always has full local access to its host, it can restrict or even remove its own remote access to such host for security reasons.

Thus, it should be appreciated that the present invention is not limited to registered hosts and registered users. Users and hosts can be anonymous. Anonymous users do not have a unique identifier. This situation occurs when a user ID or other user identifier is not required to log into or access a host. For example, a public computer host or terminal, such as a public computer terminal located at an airport, may not require a user ID for the log in procedure or process. This enables anonymous users to run a certain application in a virtual reality environment associated with the terminal without having to perform any formal log in procedures. This essentially provides unrestricted access to the public terminal for purposes of, for example, finding a specified location within the airport or other like public venue, such as a shopping mall.

An anonymous host may have a unique identifier assigned to it. This identifier may be temporary and may change each time a network connection is made via the anonymous host. This situation is similar to the TCP/IP (Transmission Control Protocol/Internet Protocol) dynamic IP addressing scheme which dynamically assigns IP addresses to computers that have a dial-up Internet connection. In general, anonymous hosts cannot be accessed directly from other remote hosts except if a "Follow User" mode is utilized to locate a certain user as described in more detail below.

There are several reasons why anonymous hosts are utilized by the present invention. Such hosts may be typically used when remote access to the public host is not required. For example, in the case discussed above, public virtual reality terminals can be accessed only locally. These public terminals preferably do not store independent copies of the shopping mall VRE. Rather, they are connected as passive clients to a server host which has a centrally installed hosted shopping mall VRE. Accordingly, there is no need to provide remote access to the public hosts terminals, since they don't store any VREs, and there is nothing to access at public terminals. Such hosts can conserve server disk space because its home session server does not store permanent registration data. Such hosts provide a higher level of security in one direction since anonymous hosts cannot, in general, be directly accessed from other remote hosts. Such hosts are better suited for mobile or portable computers or access devices.

Dynamic roaming procedures are more typically and frequently utilized by mobile or portable computers in order to provide network access or connection. An anonymous host's dynamic roaming procedures are generally faster than a registered host's roaming procedures. Unlike the registered host, the anonymous host has no permanent home session server. Therefore, the anonymous host is not required to contact and/or notify a home session server each time the anonymous host changes connections to some other session server, namely, a session server that is currently nearest to it. For registered hosts, home session server notification is mandatory because it gives other users the opportunity to locate such a host on the network.

In addition, the anonymous host cannot participate in network expansions because it does not have a permanent host ID which may be subject to change during, for example, host name aliasing as described in detail below. Although an anonymous host does not have a permanent identifier, it preferably has an owner (i.e., a registered or anonymous user). This is necessary to provide the owner with privileged and unlimited access to the host in order to, for example, create, delete or modify virtual environments on the host, determine security and privacy rules associated with other users and perform other like procedures.

As further illustrated in FIG. 1, the computer network system 10 provides various servers through which registration, location and access of hosts 12 can be established. In general, a server of the present invention includes a database that stores data associated with the hosts and a processor adapted to access such database and transmit such data. For example, the present invention preferably includes name servers 20, such as child name servers and a root name server, data servers 21 and session servers 18 which store and transmit data associated with hosts 12 and users 16. This data is utilized to register, locate and access hosts 12.

As previously discussed, each host 12 is assigned to a home session server 18 during the registration process. An example of a host registration process is performed as follows and illustrated in FIG. 2. The host 12 has a software installation program which is adapted to establish a network connection between the host 12 and the root name server 21a. The host 12 sends a "find nearest session server" request to this server 21a as shown in callout 1 of block 21b. The root name server 21a prompts the host 12 for further information, such as a current IP address, physical location, telephone numbers and other information which may be used to better locate the home session server associated with this host 12.

Figure 2:
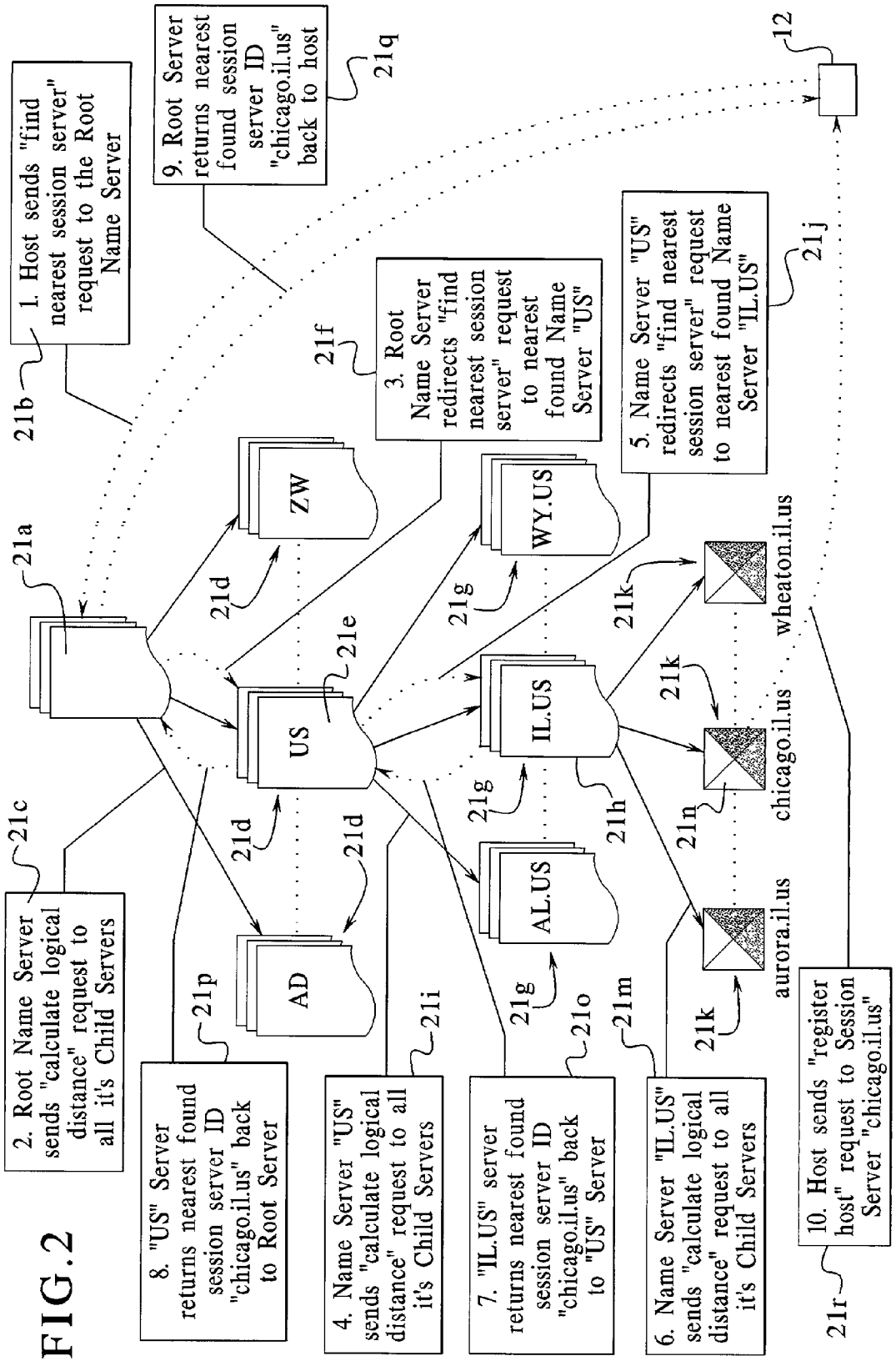
FIG. 2 is a diagrammatic representation illustrating a host registration in accordance with one embodiment of the present invention.

As further illustrated in FIG. 2, the root name server sends a "calculate logical distance" request (as shown at callout 2 of block 21c) to each of its child name servers 21d and session servers (not shown). This provides the child servers 21d with information regarding the host 12 associated with the previous step in the registration process. Each child server 21d returns to the parent server 21a the calculated logical distance between that server 21d and the host 12. When a reply is received from each of the child servers 21d, the root name server 21a selects the server 21d that has the minimum logical distance to the host 12. If this server is a name server (i.e., name server "US" 21e), the root name server 21a redirects a "find nearest session server" request to it as shown in callout 3 of block 21f.

Name server "US" 21e performs the same procedure that the root name server 21a previously executed by retransmitting a "find nearest session server" request to one of its child servers 21g that has a minimum logical distance to the host 12, namely, the name server "IL.US" 21h as shown in callout 4 of block 21i and callout 5 of block 21j. Name server "IL.US" 21h similarly executes a request to each of its child name servers (not shown) and session servers 21k to calculate the logical distance as shown in callout 6 of block 21m. This request results in the "chicago.il.us" server 21n as the server nearest in logical distance to the host 12 in the example. Since the "chicago.il.us" server 21n is a session server, the request is complete. Thus, the information associated with this session server 21n (i.e., server ID, IP address and other like information) is returned to the host by way of the name sever "IL.US" 21h via name server "US" 21e and the root name server 21a as shown in callout 7 of block 210, callout 8 of block 21p and callout 9 of block 21q. With this information associated with the session server 21n, the host can send a "register host" request to that session server 21n as shown in callout 10 of block 21r.

To complete registration, further information relating to the host and its user is transmitted to the host's home session server. This information includes, for example, nickname, current host IP Address, owner ID (only required for secondary host registration), password and other like information. Using this information, the session server creates a unique host ID associated with the host that is stored in its database. The session server sends the host ID to the host where it is stored locally at the host for use associated with subsequent connections to the network. For example, each host is required to send its host ID to the home session server each time it connects to the network in order to identify itself.

Figure 3:
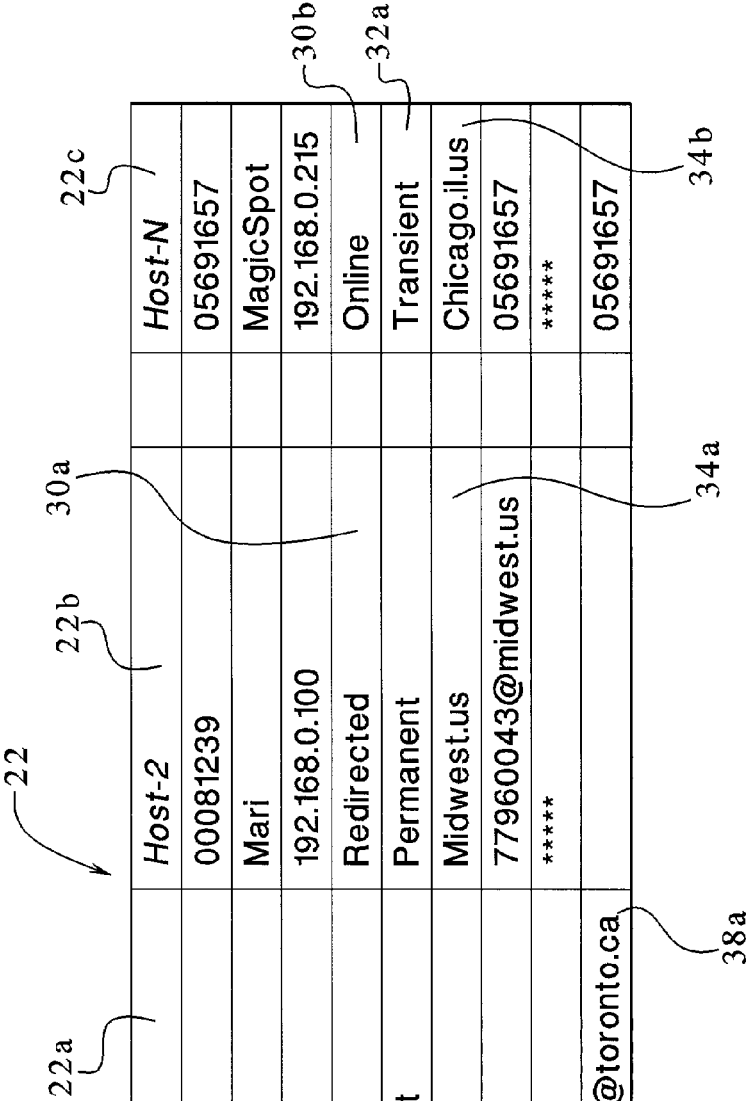
FIG. 3 is a table illustrating example data of a session server database identifying a number of registered hosts of one embodiment of the present invention.

The registration information is utilized to locate and access hosts and is stored in data fields associated with the home session server's database 22 as illustrated in FIG. 3. As further illustrated in FIG. 3, the home session server can be utilized for a number of different hosts as indicated in block 22a, block 22b and block 22c.

As previously discussed, the home session server includes a number of different data fields associated with its database 22. The data fields contain a variety of different information relating to the host and its user. For example, the host ID field 24 uniquely identifies the host as previously discussed. A nickname field 26 contains a name associated with the user who owns the host. An IP address field 28 includes IP address information. The status field 30 contains such information as whether the host is offline, online, redirected, moved or other like status information. The type field 32 contains such information as whether the host is permanent, transient or other like information. The redirection field 34 contains such information as to where or from where the host has been moved or redirected as discussed in detail below. The owner ID field 36 identifies the owner of the host or the owner's ID. If the owner ID and the host ID are the same, then the host is the primary host of that owner as previously mentioned. The password field 38 provides a password that is necessary to access the host. The owner terminal field 40 contains information relating to what host the owner is currently logged into.

This field is used only in database records associated with primary hosts. If the owner of the primary host currently is not logged into the network, this field is blank. If the owner is currently logged into its primary host, then the owner terminal field 40 and the host ID field 24 are the same. If the owner terminal field 40 and host ID field 24 are different, then the owner of the primary host is currently logged into the network via a host having a host ID as indicated in the owner terminal field, for example, 01234567@toronto.ca as indicated in block 40a.

Upon completion of the registration procedure, the host also obtains an IP address associated with a secondary home session server. The secondary home session server can be used, for example, in place of the current or primary home session server (i.e., the home session server first contacted during host connection to the network) when the current or primary home session server is inoperable.

Referring back to FIG. 1, the network computer system of the present invention preferably includes data servers 21. These data servers are utilized to download static virtual reality data to hosts, such as three dimensional ("3D") graphics, models, sounds, textures, program modules, scripts or other like data. This type of data can be requested by hosts when, for example, creating new virtual reality environments, updating host system data, remotely accessing existing virtual reality environments that are installed on other hosts or other like operations. It should be appreciated that static 3D data, such as 3D model wire frame, graphic textures or other like 3D data, is much larger in size than dynamic 3D data that simply describes the virtual reality environment itself. For example, static 3D data associated with a wooden chair, such as a 3D skeleton which describes the shape of the chair and bitmaps that represent the wood surfaces, will generally be much larger than the dynamic 3D data that describes the chair location within a particular virtual environment (i.e., six numbers that represent a chair position and orientation). This type of data is typically transferred from the data servers 21 as compared to being transferred directly from the host computer 12.

There are two primary advantages of utilizing data servers 21 to access and transmit static 3D data. First, the data servers 21 can transmit this data much faster than if, for example, the data was transferred from another host. The data servers 21 typically have a much faster network connection. Second, the host computer 12 will not then be overloaded with requests to transmit such data (i.e., outgoing network traffic). Thus, the host computer 12 can potentially serve more connecting client host computers.

It should be appreciated that static 3D data is not required to be transferred from the data server 21 to the host computer 12 each time the user wants to access some remotely hosted virtual reality environment. Since this type of data cannot be changed by the host owner or any other user, such data is required to be transferred only once to a user's computer. The data is then stored or cached in local storage associated with the host for subsequent use. The next time that the user connects to a remotely hosted virtual reality environment, this data can be transferred from its local storage thereby significantly reducing the time necessary for the user or more appropriately its host to access the virtual reality environment of a certain remote host, that is, the data server is bypassed during this data transmission.

More specifically, in one preferred embodiment of the network architecture of the present invention, each session server has primary and secondary data servers assigned to it. Relative to a host, which has assigned a home session server assigned to it, these data servers are called home data servers of that host. Home data servers are used by hosts as default data servers, which they'll try to connect to first to download static virtual reality data.

When a user at a local host accesses a virtual reality environment at some remote host, the remote host becomes a server for the local host providing it with the needed virtual reality environment data, while the local host acts as a client. In order to communicate with the server host, the client host must obtain a copy of the virtual reality environment data, which is comprised of static and dynamic data.

Dynamic data describe actual current parameter values of all object exemplars, such as, for example, object coordinates within the virtual reality environment and the like. The set of object parameters for a particular object exemplar depends on its type and can vary for different objects.

Unlike dynamic data, static data contains information about object types, such as, for example, object 3D models, graphic textures, control routings code, and the like. Object type static data is shared by many object exemplars of this type, which may be located at the same or different virtual reality environments. For example, several different virtual reality environments may have a plurality of exemplars of some DOOR object located at different places, each of which has the same 3D model and control routine, for example, implementing door open/close function. Thus, the DOOR object 3D model is shared by a plurality of DOOR object exemplars.

Dynamic data records, which describe particular object exemplars within the environment contain references to static data records. These references are preferably stored in dynamic data records in a conventional form of Globally Unique Identifiers (GUIDs), which are represented by 16-byte values. After the dynamic data are received by the client host, it can retrieve the list of all needed static data GUIDs from dynamic data records and issue the request for static data records to a data server passing it the list of GUIDs as a parameter.

It should be appreciated that the client host first checks the entire GUIDs list to determine whether corresponding static data records within the list were already cached in its local storage (i.e., client hosts's hard drive). The client then filters out all found GUIDs from the list, since static data records referred by them can be retrieved directly from the hosts's cache without requesting a download from the data server. All missing static data records (i.e., those that are not in cache) are then downloaded from a data server, and cached for subsequent static data requests.

In order to download the required static virtual reality data, a client host must obtain the IP addresses of its home data servers. These addresses are passed to the host from it's home session server each time the host goes online. Having these IP addresses, the client host first tries to access and download needed static data from the primary data server. If the client host detects that the primary data server is overloaded or inoperable, it tries to download needed static data from the secondary data sever. If some of the required static data still can not be found on either of the client's home data servers, the client host must contact the home data servers of the server host and download the needed static data from there. The client host obtains the IP addresses of home data servers of the server host during the dynamic virtual reality environment data transfer. It then uses these IP addresses to access the server host home data servers to download the static data which were not found on the client's home data servers.

The client host also passes the IP addresses of the server hosts home data servers to it's own home data servers when issuing the request for static data download. This facilitates the automatic distribution of static virtual reality environment data between data servers. Each time a home data server of the client host receives the request for static data download from it, it also receives the IP addresses of home data servers of the server host, to which the client host is trying to connect. If some static data can not be found in the database of a client's home data server, it contacts the home data servers of the server host and requests the transfer of such static data to itself. From the moment all indicated static data were copied, the home data server of the client host can provide these data to other hosts which may request them in the future.

It should be appreciated that the described process of static data distribution between data servers is asynchronously relative to any host-to-host communication and may be scheduled by a data server for any appropriate time. After the data server has determined that it cannot provide some static virtual reality data to the requesting client host, as it was described above, it can, depending on its current workload either immediately initiate data transfer or do this subsequently. The main purpose of such data pre-retrieval is to facilitate download of static data which may be requested by hosts. It reduces the workload factor of home data servers of the server hosts, since after their static data were pre-retrieved by other data servers, they can be downloaded directly from them. On the other hand, client hosts requesting some static data may get them faster from their own home session servers, since these servers are the nearest to client hosts by logical distance.

It should be appreciated that all of the static data of the virtual reality environment stored locally at a host must be present at primary and secondary home data servers of that host. In this way, all connecting client hosts and their home data servers are guaranteed to obtain needed static data in case they cannot be found both at the client host cache and it's home data servers. In order to meet this requirement of network architecture, any host, which has created a new virtual environment or added object exemplars of a new object type to the existing environment must communicate all new static data used by the virtual reality environment to it's own home data servers.

There are several ways the host can obtain and register new static data. Such data may come on a data storage medium such as a diskette, a hard drive, an optical disk (i.e., CD-ROM) or be downloaded from the Internet as a collection of object models, or such models may be, for example, created and registered at the host with the help of the appropriate authoring tools. In any case, whenever new static data are added to the existing or created virtual environment available for remote access, the host obtains from its home session server the IP address of the primary (or secondary, if primary is not available) home data server and sends it the request for static data update. This request contains the list of all new static data GUIDs, that were added to the host local cache. The home data server responds with a sublist of those record GUIDs from the original list, that are not stored in its database. After this, the host transfers all of the missing static data records to the data server. Depending on what data server (i.e., primary or secondary) was contacted by the host, that server is responsible for further transmitting the obtained static data to the companion data server (i.e., secondary or primary).

It should be appreciated that in order to prevent the unrestricted increase of the amount of static data on the data servers, the data records, that are not used by the hosts should eventually be removed. This process may be initiated, for example, when the data server needs to free disk space for storing new static data records. To keep track of static data usage, each data server stores the lists of the referring hosts for all static data records. The data server adds the host ID to the list of referring hosts associated with the record each time the host issues a data update request containing that record GUID, as described above. The data server removes the host ID from the list associated with the record each time the data removal request for that record is issued by the host.

A static data record removal request is sent by the host to its home data server if there are no references left to this record from any dynamic data records which describe the virtual reality environments stored at the host. This may happen when, for example, the last exemplar of some object of a certain type is removed from the virtual environment and all other virtual environments don't have object exemplars of this type. Thus, when the host sends a data removal request, it passes to the data server the list of GUIDS of those static data records, that are no longer used by the host.

To overcome the issue of "idle hosts," (i.e., those hosts that stay offline for a long period of time), the static data removal request may be sent to the data server by the idle host's home session server on it's behalf. Such requests are sent to the data server when a host's idle time limit at the home session server has been expired. In this case, the session server requests the data server to release all static data records associated with the idle host and marks that host as "idle" in its database. If such idle host subsequently goes online, it then will have to resubmit all its static data to primary and secondary home data servers as described above.

Returning now to static data records, it should be appreciated that those records, which have empty lists of referring hosts associated with them are not removed from the data server immediately after the data removal request. In fact, they may stay on the server for a certain period of time. Nevertheless, such records must be removed from the data server when, for example, the data server has insufficient disk space for new records, which may be requested by hosts to be stored at the server. Candidates for removal may be selected by the data server, for example, with the help of, well known in the art, LRU (Least Recently Used) algorithm.

Figure 4:
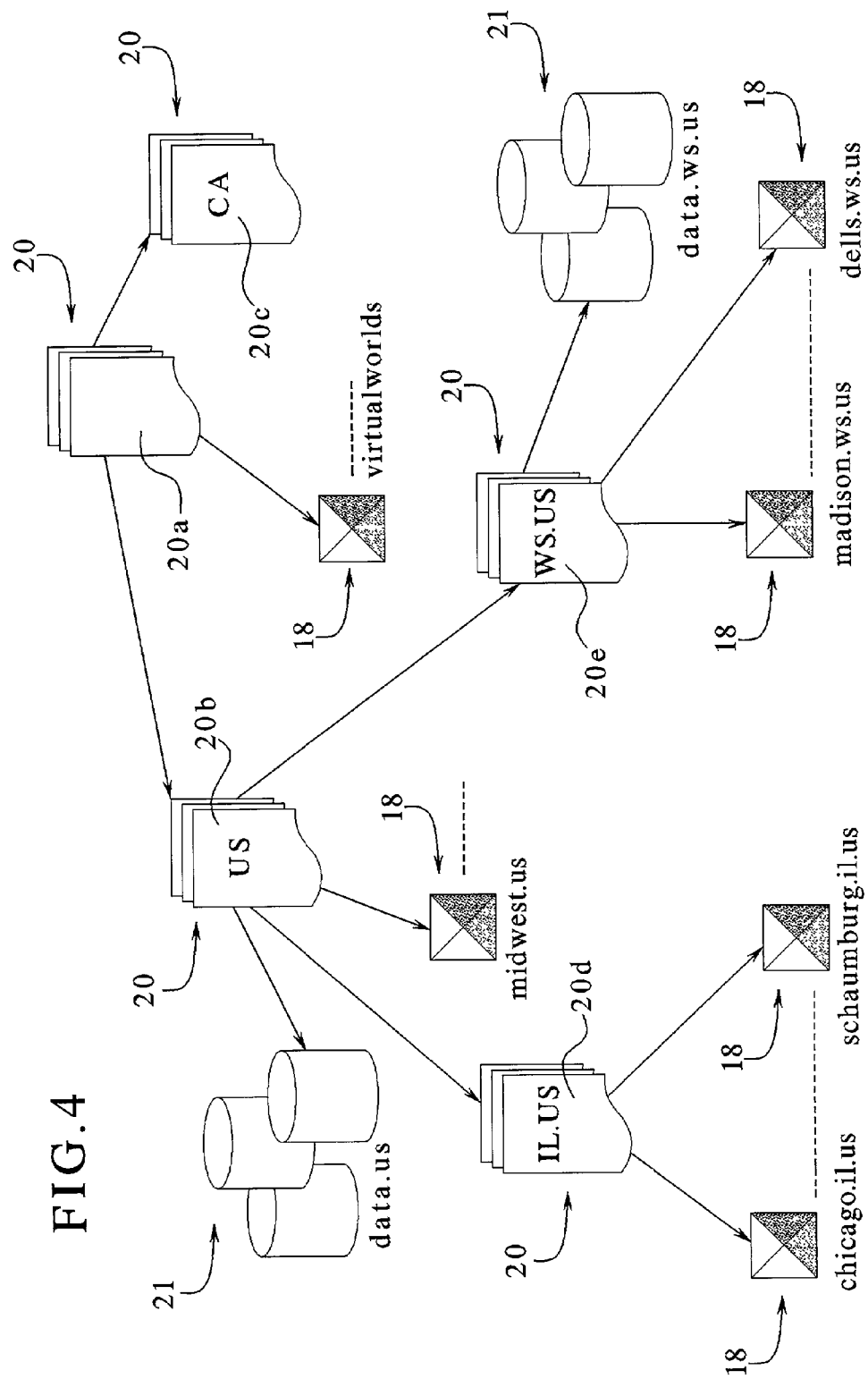
FIG. 4 is a diagrammatic representation illustrating the network hierarchy of name servers and session servers of one embodiment of the present invention.

As illustrated in FIG. 4, the name servers 20, session servers 18 and data servers 21 form an architecture hierarchy. This is important for purposes of locating hosts and servers as described below. The base of the hierarchy structure is formed by a number of name servers 20 which are positioned at a variety of different domain levels. In FIG. 4, the name server 20a is at the root of the hierarchy, that is, it is located at the highest domain level. The name server 20b and name server 20c are located at a next highest domain level. The name server 20d and name server 20e are located at the lowest domain level as illustrated in FIG. 4. Once the hierarchy of name servers 20 is established, the session servers 18 and data servers 21 are connected to the various name servers as further illustrated in FIG. 4.

Figure 5:
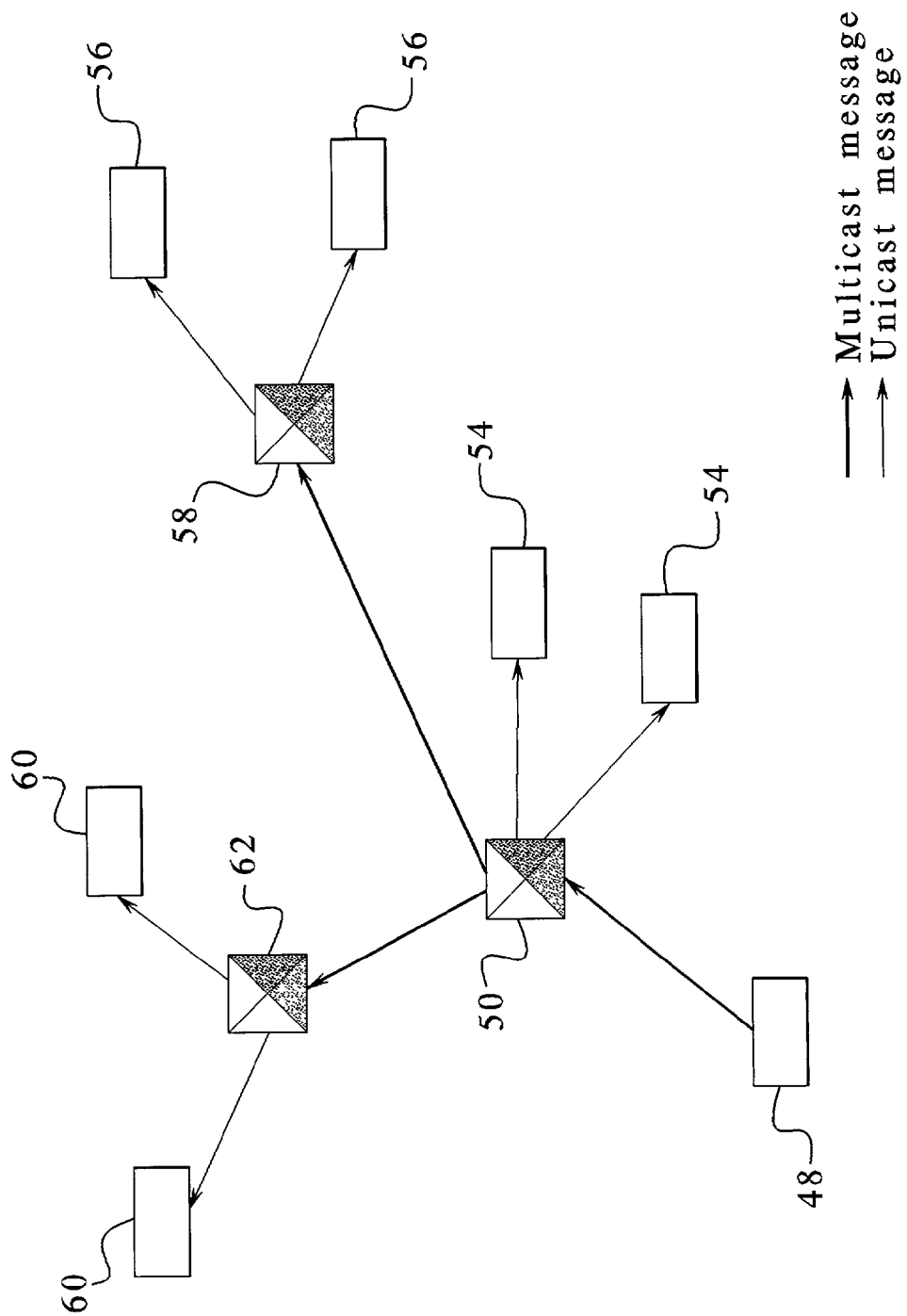
FIG. 5 is a diagrammatic representation illustrating the virtual reality environment network executing multi-cast messaging and uni-cast messaging of one embodiment of the present invention.

As previously discussed, the computer network system of the present invention includes session servers 18. The session servers are utilized to register hosts as previously discussed. The session servers are also utilized to conduct and direct outgoing hosts network traffic to a plurality of communicating hosts. The hosts transmit data destined to a plurality of other hosts via interconnected session servers as illustrated in FIG. 5. Data from the host 48 is transmitted through its home session server 50. This data is then transmitted to hosts 54, hosts 56 (via session server 58) and hosts 60 (via session server 62). This is referred to as multi-cast messaging wherein data is transmitted to a number of hosts through a single session server.

The multi-cast messaging function directed from the home session server significantly reduces the host's outgoing network traffic. The host only needs to transfer one message to its home session server 50. This message or data is relayed, communicated or transmitted to a number of other hosts and session servers as illustrated in FIG. 5. The data transmitted directly from the session servers to the hosts is referred to as uni-cast messaging (i.e., data transmitted from session server 50 to host 54), that is, data is transmitted to an individual host.

The reduction in outgoing network traffic sent from the host is critical considering the fact that a host, in general, does not have an efficient Internet connection, particularly when the host is a mobile, personal computer or other system access device as compared to a miniframe or mainframe computer. It should be appreciated that the use of session servers as a gateway to the network for hosts is applicable for hosts computers that have either a wire network connection (i.e., modem) or a wireless network connection.

In addition to reducing outgoing host network traffic, session servers are further utilized to optimize the network connection speed for a particular host. This results from the fact that session servers can be located in a number of different geographical regions. Increased network connection speed becomes particularly critical when the user attempts to access the network via a remote host.

Figure 6A:
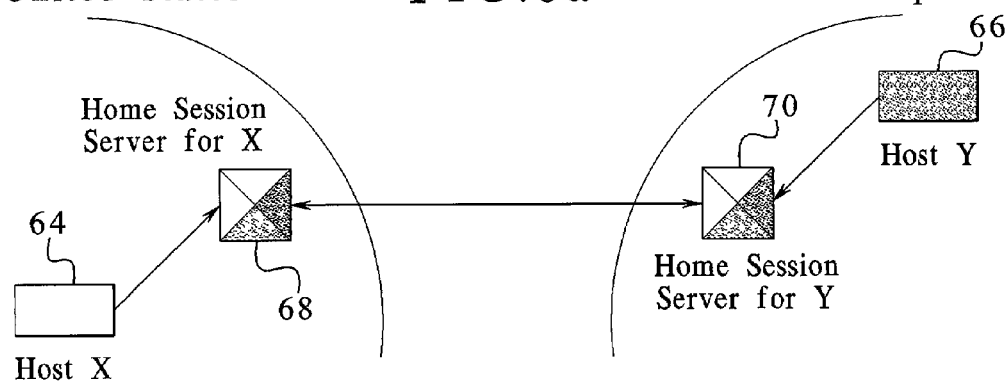
FIGS. 6a, 6b and 6c are diagrammatic representations illustrating dynamic host roaming processes during the establishment of network communication sessions between hosts.

For example, the user can access the network via a remote host, such as a mobile or portable computer when the user is out of the user's office or not at the user's local host. In order to facilitate network connection speed, dynamic roaming is utilized to locate a session server (not necessarily the home session server of its local host) nearest the remote host. The dynamic roaming function is diagrammatically illustrated in FIGS. 6a, 6b and 6c. In FIG. 6a, a network connection is established between host 64 (i.e., host X) and host 66 (i.e., host Y) via session server 68 and session server 70, respectively. The session server 68 is the home session server of host X and the session server 70 is the home session server of host Y. This illustrates the typical situation where the host establishes a network connection via its home session server.

Figure 6B:
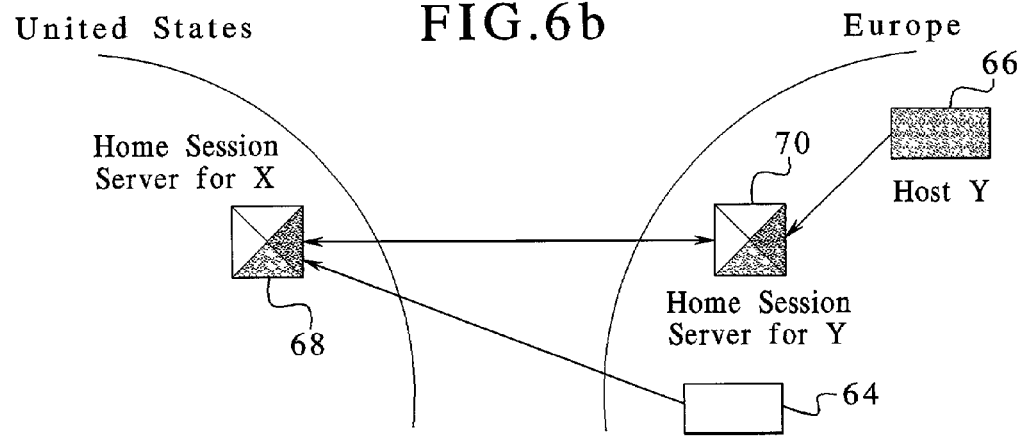
Figure 6C:
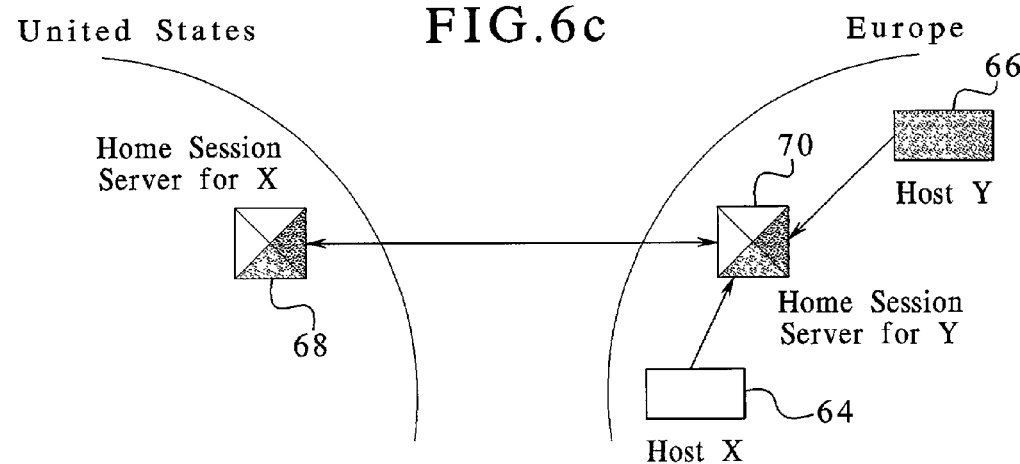

In FIG. 6b, a network communication is established between host X and host Y. Host X attempts to make this connection via session server 68 while host X is located in Europe and the session server 68 is located in the United States. However, this type of network connection results in a decreased network connection speed due to the increased logical distance between host X and session server 68.

To increase the network connection speed for this situation, host X is redirected to the session server 70 (i.e., dynamic roaming). Once redirected, host X and host Y communicate via a single session server, namely session server 70. This results because session server 70 is the nearest available session server to host X. In general, the nearest available session server can be determined by calculating and comparing the logical distances $F_i$, where i is a positive integer, between any number of available servers and the host. The logical distance F is a function of the number of hops H between servers and a neighbor server current workload ratio R.

It should be appreciated that other hosts attempting to establish network communication with host X through its home session server (i.e., session server 68) will be informed that host X's session server has been temporarily moved to the session server 70. When host X is redirected, session server's 68 database can be updated with this information by communicating with session server 70. The redirection information is preferably stored in session server's database 68 as illustrated in FIG. 3. For example, the redirection field 34 of the host permanent record associated with the home session server 68 can include information relating to the whereabouts of host X, for example, as indicated in box 34a.

In addition, the host is marked as redirected in the database of its home session server (i.e., session server 68). This appears, for example, in the status field 30 as indicated in box 30a as further illustrated in FIG. 3. Further, the roaming session server (i.e., session server 70) identifies the host as transient in the type field 32 as further illustrated in FIG. 3 and indicated in box 32a and stores the host's home session server name in the redirection field as indicated in box 34b. This signifies that the session server is not the home session server of this host.

The present invention thus enables a user to locate the remote host although the host has been moved or redirected from its home session server. Dynamic roaming can also be applied to the situation where the primary home session server is overloaded in such a way that network sessions are established via the secondary home session server as previously mentioned. With this information, the other hosts can establish network communications with the redirected host (i.e., host X) via its roaming session server (i.e., session server 70).

Alternatively, the host can be permanently moved and relocated to another host location (i.e., another session server) as illustrated in FIG. 7. This is referred to as host name aliasing. The session server 72 associated with the old host location (indicated in block 74) identifies this host 75 as being moved as shown in the type field of the session server database indicated in block 76. In addition, this session server's database indicates the new location of the host in the redirection field of its database as further indicated in block 76. The session server 78 associated with the new host location (indicated in box 80) identifies the host 75 as being permanently relocated as shown in the type field of this session server's database as indicated in block 82.

As further illustrated in FIG. 7, the host 75 obtains a new host ID when it is moved to its new location. This type of roaming mechanism can be utilized to preserve host names which were initially associated with some high level domain (i.e., name server 84) yet had to be moved to another session server 78 associated with a lower level domain (i.e., name server 86) due to network expansion. Thus, when another host (not shown) attempts to establish network communication with host 75 via the old session server location, it will be prompted with the information that the host 75 has been permanently moved. This host can update its address information relating to the move such that it can contact the new home session server (i.e., session server 78) directly when it again attempts to establish network communications with the host.

It should be appreciated that the host 75 effectively has two names after the move. Host 75 has a primary name (the newly assigned one, i.e., 00005678@alpha.com as indicated in block 80) and a secondary name (the old one, i.e., 00001234@alpha.com as further indicated in block 80) which is used as an alias. Therefore, network communication with the host 75 can be made directly or indirectly by utilizing the primary name and secondary name, respectively.

It should be appreciated that session servers of the present invention do not assign IP addresses to hosts. The present invention can operate over the TCP/IP network protocol level which generates the IP addresses. Therefore, the present invention uses these IP addresses.

The IP addresses can be assigned to network nodes either in a static or dynamic way. For example, all servers must have static IP addresses such that hosts can establish TCP/IP connection with servers. With respect to hosts, IP addresses can be both static and dynamic. The session servers store and use host IP addresses associated with the servers database only when the host is online as indicated, for example, in the STATUS field 30 of the server's database by the "online" value of block 30b. Otherwise, the IP address is not utilized because hosts obtain new and different IP addresses each time a host goes online.

It should also be appreciated that server names may not belong to the Internet DNS (Domain Name System) namespace because the present invention does not necessarily rely on the existing DNS infrastructure. In other words, names associated with the servers of the present invention are not associated with a particular domain name on the Internet. Thus, the name system associated with the present invention may not interfere with the existing Internet domain name system. The server names, such as "alpha.com" and "chicago.il.us" as previously mentioned, provide illustrative examples of the types of names that can be utilized.

As previously discussed, the present invention provides systems and methods for users to communicate and operate within virtual reality environments. The host is a central component of the networked computer system of the present invention because it houses the virtual reality environment such that users can effectively interact with the virtual reality environment to for example, create and customize its personal virtual reality environment, communicate with other users within its personal virtual reality environment or another user's virtual reality environment or perform any suitable computer application or function within the virtual reality environment.

Figure 8:
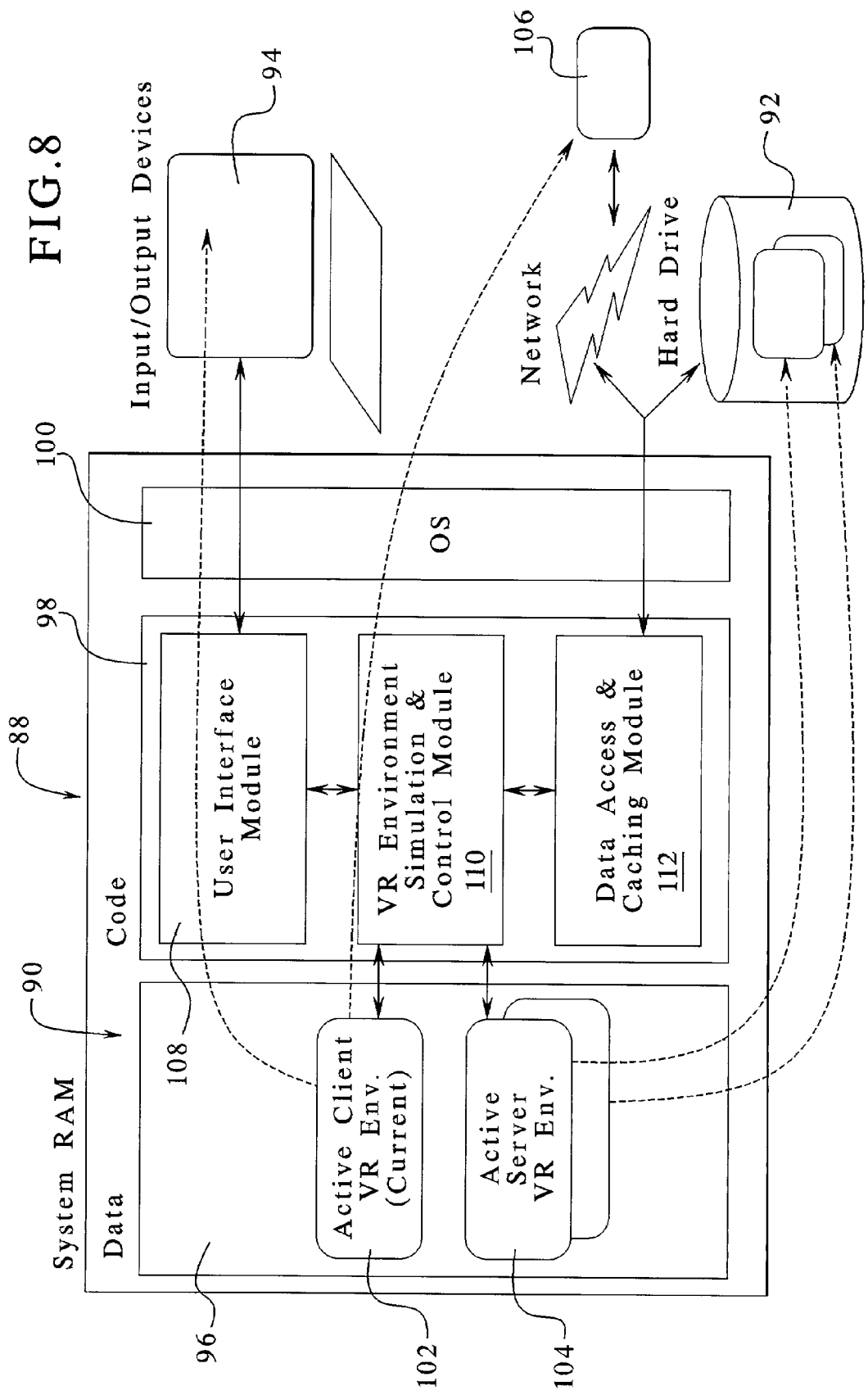
FIG. 8 is a diagrammatic representation illustrating the host system software architecture of one embodiment of the present invention.

In general, in one embodiment host 88 is a computer which includes a central processing unit connected to a number of conventional hardware or software computer components such as system random access memory ("system RAM") 90, hard drive 92, input/output devices 94, such as keyboard, mouse, computer display, speakers and other like computer components as illustrated in FIG. 8. The system RAM includes, for example, data 96, code 98 and an operating system (OS) 100 as also shown in FIG. 8. It should be appreciated that the host could be arranged in any other suitable manner in accordance with the present invention.

For example, the program code may be embodied on any of a variety of known media, such as a diskette, hard drive, an optical disk (i.e., CD-ROM) or the like. The code may be distributed on such media, or may be distributed to hosts from the memory or storage of one host computer over a network of some suitable type to other host computers for use. It should be appreciated that any suitable technique and/or method for embodying software program code on physical media and/or distributing software code via networks can be utilized.

To properly house the virtual reality environment, the host accounts for the complex structure of the virtual reality environment which includes both virtual reality environment data (including static data originally received from the data servers and dynamic data received from other hosts or the memory of the hosts) and program code. The data can include for example an active client virtual reality environment as indicated in box 102. The active client virtual reality environment can be transmitted from another host 106 during network communication session. The operation within this virtual reality environment can be viewed on the input/output device 94 by a local user (not shown).

In addition, the data can include an active server virtual reality environment as indicated in box 104. The active server virtual reality environments are permanently stored in the host's hard drive 92 and can be transmitted to remote hosts (not shown) via network communication sessions. A detailed discussion of network communication between hosts is provided below.

Before communication and interaction within the virtual reality environment can proceed, the virtual reality environment must be activated. The activation of a virtual reality environment is analogous to opening a locally stored text file with, for example, any suitable data processing software. In this example, the activated virtual reality environment is analogous to the opened text file. In addition, multiple virtual reality environments can be activated at the same time just as multiple text files can be opened by the data processing software.

However, the virtual reality environment is not activated by simply installing it into the system memory. Rather, the virtual reality environment must also be activated by the host software, that is, the host software, for example, runs various routines that control the behavior of active objects within the virtual environment, such as, for example, robots and handles various event flows, and performs other like operations.

Host program code includes, for example, a user interface module, a virtual reality environment simulation and control module, a data access and caching module or other like virtual reality process modules as indicated in box 108, box 110 and box 112, respectively.

The user interface module 108 can be utilized, for example, to perform visual rendering of current active virtual environments on a computer screen and audio rendering of current active virtual environments on speakers, headphones or other audio devices. It can further be utilized to accept user input, such as a keyboard, a mouse or other like input. The user interface module 108 translates this input into appropriate control commands, such as user avatar movements, object control commands, virtual reality environment activating commands, host user login/logout commands and the like. The translated input is sent to the virtual reality environment simulation and control module 110 for execution.

The execution includes a variety of different operations. For example, the virtual reality environment simulation and control module 110 loads and activates in system memory the virtual reality environment that is requested by the user (via the user interface module). To activate the virtual reality environment, the virtual reality environment simulation and control module 110 requests the data access and caching module 112 to provide the necessary static and dynamic virtual reality environment data. Once activated, the virtual reality environment simulation and control module 110 can execute control commands received from, for example, the local user, remote and network connected hosts or from object and environmental control routines. In the latter case, control commands are generated automatically by such routines as a result of the virtual reality simulation process.

For example, an active object, such as an "automatic door," can have an assigned scripting routine that causes the automatic door to open each time a user (represented by an avatar) approaches it. Environment control routines, for example, may include geometrical collision detecting routines which prevent interpenetration of object boundaries or other like routines that simulate the laws of nature, such as mechanics, hydrodynamics and the like. The virtual reality environment simulation and control module 110 can also perform any necessary run-time security and privacy checks.

The data access and caching module 112 is utilized to deliver data that is necessary to activate and run the virtual environments as previously discussed. For example, it translates dynamic and static virtual reality data requests issued by the virtual reality environment simulation and control module 110 to network requests to remote hosts and data servers. The data access and caching module 112 can receive and locally store static virtual reality data associated with the host for subsequent use. It can further perform network communication sessions by, for example, transmitting virtual reality control commands and data which are compiled and sent between hosts as unicast or multicast messages. The data access and caching module can also store and provide secured certified access associated with host owner private data, such as personal address books, passwords and the like.

Once the virtual reality environment(s) is activated on a host, the environment can be accessed and operated by other hosts which are allowed access to such environment as indicated above and further described below. Although several virtual reality environments can be activated on a host acting as an active server, preferably one of the active environments is displayed at one time. This type of active virtual reality environment is referred to as a current active environment as further indicated in box 102 of FIG. 8. The remaining active virtual reality environments run in a stealth mode on such host; that is, they remain open or available for other remote users to operate within them. However, the local user cannot view any changes made by the remote users to the active virtual reality environments that run in stealth mode if the local user is working in the current active environment which is viewed on a display screen. The local user may view the active virtual reality environments that run in stealth mode by, for example, viewing them through virtual displays which are located within the current active environment.

It should be appreciated that remote access to locally stored virtual reality environments can be controlled in a variety of different ways. As previously discussed, every host has an owner (i.e., a certain registered user). This provides the owner user with the ability to implement access restrictions for its host as further discussed. For example, the owner user can specify that only active virtual reality environments can be accessed. Alternatively, the owner user can specify that certain users can access non-active virtual reality environments. However, non-active virtual reality environments would have to be opened or activated by the local host upon request of the remote user prior to access by the remote user.

When hosts establish network communication with one another, the terms "client" and "server" are used to describe the relationship between the hosts. In general, the term "server" means a host that locally stores and operates data, and the term "client" means a host that issues a request to access the data hosted by the server. For example, when a remote host accesses the active virtual reality environment associated with a local host, the remote host becomes an active client for the local host (i.e., the remote host operates the virtual reality environment in active client mode) while the local host acts as an active server to the remote host. As viewed and operated by the remote host, the virtual reality environment is a current active environment.

As applied to the networked computer system of the present invention, one main distinction between a server host and a client host is that only a server host running an active virtual reality environment can modify the permanent data associated with the active virtual reality environment. This data is stored in the server host's local persistent memory (i.e., a hard drive). Direct modifications of remotely hosted virtual reality data (i.e., data hosted by a client host) are preferably not allowed. This protects a host's permanent or locally stored virtually reality data from being modified by remote hosts that run the same virtual reality environments associated with the local host. In other words, the local host has complete control over modifications to its own locally stored virtual reality data. Thus, in order to remotely change this data, the virtual reality environment should be activated from the local host in server mode such that a local or remote user can request the local host to make such changes. It should also be appreciated that the local host has control over modifications to the static data stored remotely (i.e., such as on data servers) for a virtual reality environment controlled by said local hosts.

Figure 9A:
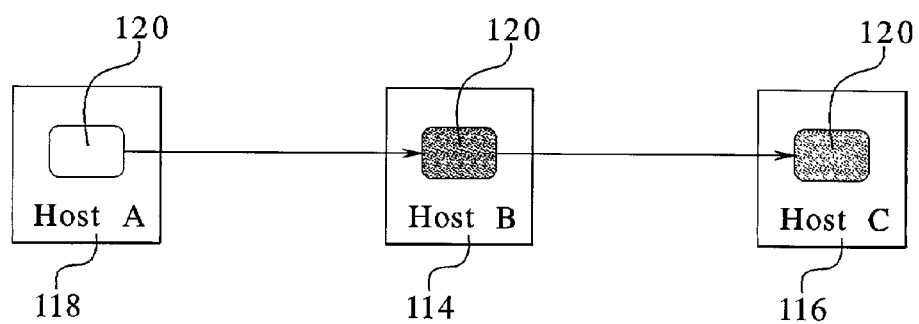
FIGS. 9a and 9b are diagrammatic representations illustrating host client mode.

It should be appreciated that the present invention does not contemplate the situation where a host acts as both a server and a client for the same activated virtual reality environment. This situation is illustrated in FIG. 9a where host 114 (host B) acts as both a client for host 116 (host C) and a server for host 118 (host A) with respect to the active virtual reality environment 120.

Figure 9B:
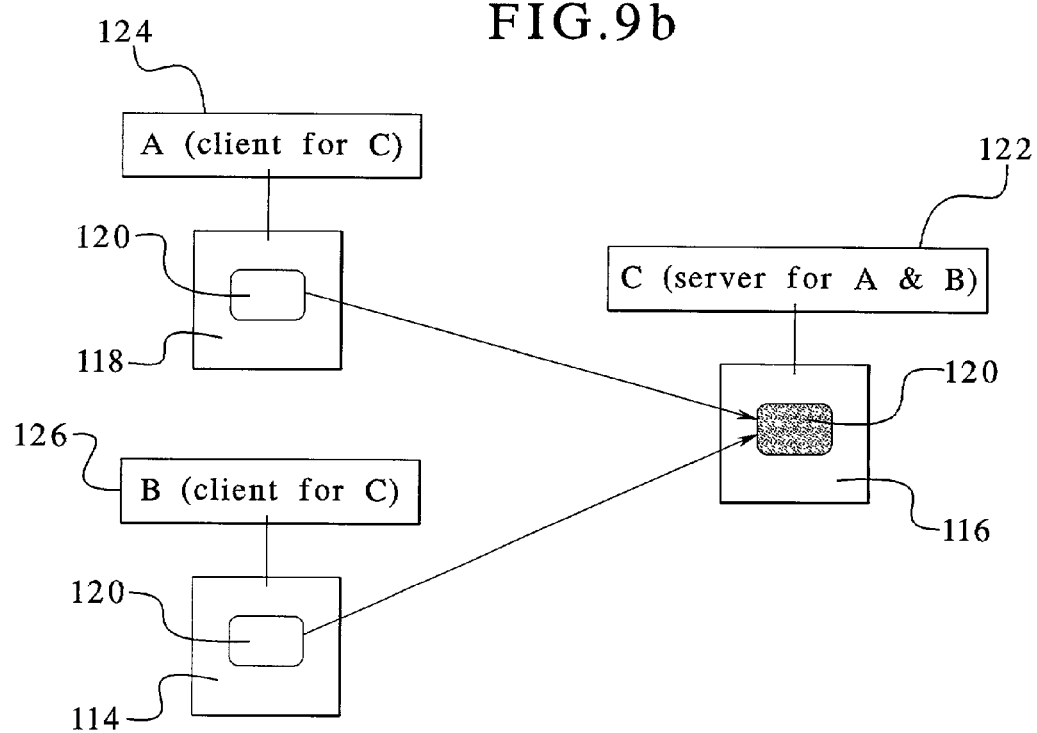

On the other hand, FIG. 9b illustrates one embodiment of client mode according to the present invention. Host A and host B each act as a client for host C as indicated in block 124 and box 126, respectively, with respect to the active virtual reality environment 120. That is, host A and host B each receive data relating to the virtual reality environment 120 from host C. In turn, host C acts as a server to both host A and host B as indicated in block 122. That is, host C transmits data relating to the virtual reality environment 120 to both host A and host B.

It should be appreciated that a host cannot activate a client virtual reality environment in stealth mode since stealth mode is used only when a host acts as a server for some virtual reality environment such that it allows remote clients to access this environment. In addition, remote clients cannot access a virtual reality environment associated with a certain host which is run in active client mode.

Figure 10:
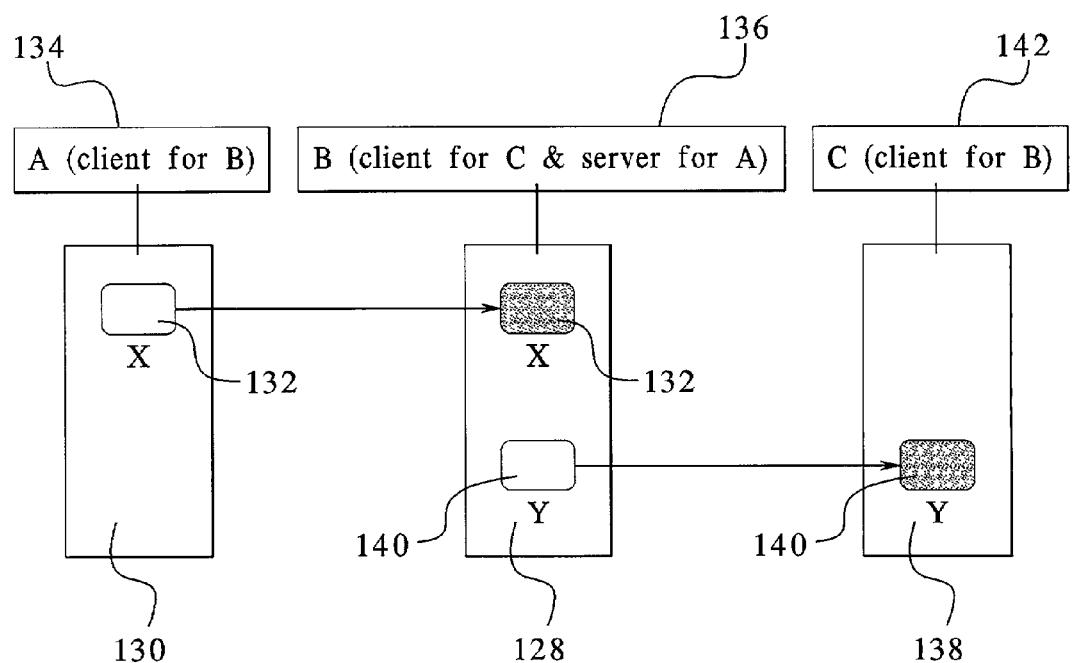
FIG. 10 is a diagrammatic representation illustrating a host acting in both client mode and server mode.

However, a host can act as both a client and a server associated with two or more different virtual reality environments as illustrated in FIG. 10. Host 128 (host B) acts as a server for host 130 (host A) with respect to the virtual reality environment 132 labeled X as indicated in block 134 and block 136. Alternatively and simultaneously, host B can act a client for host 138 (host C) with respect to the virtual reality environment 136 labeled Y as indicated in block 142.

It should be appreciated that active virtual reality environments can be accessed in a variety of different ways. FIGS. 11a through 11d illustrate four such examples. In FIG. 11a, the host 144 acts as a server for several active virtual reality environments 146 that run in stealth mode. The remote hosts 148, acting as clients, establish network connections with the host 144 via a session server 150 to access the active virtual reality environments. The virtual reality environments are run as current active client environments 152 on the remote hosts 148 as compared to active server environments 146 running in stealth mode associated with host 144. Thus, the host 144 acts an active server for the remote hosts 148.

In FIG. 11b, a local user 154 monitors the active virtual reality environment 156 running as a current active server environment on the host 158. It also enables the local user 154 to establish a network communication session via the session server 160 with those remote hosts 162 (i.e., users associated with the remote hosts) who currently access the active virtual reality environment associated with the host 158 that functions in active server mode. The virtual reality environments are run as current active client environments 164 on the remote hosts 162 as compared to active server environments 156 running as current in host 158.

In FIG. 11c, the host 166 establishes network communications via a session server 168 to access an active virtual reality environment 170 of a remote host 172, acting as a server. Once accessed, the host 166 runs the active virtual reality environment in client mode 174 (i.e., a current active environment) such that it can be viewed and operated on a display 176 by a local user 178.

As illustrated in FIG. 11d, the host 180 acts a both an active client and active server as previously discussed. The host 180 acts as a client for the remote host 172 as illustrated in FIG. 11c. Alternatively and simultaneously, the host 180 acts as a server for the remote hosts 162 as illustrated in FIG. 11b.

It should be appreciated that when a network communication session is established between the local host acting as an active server and remote hosts acting as active clients via a session server, any action(s) performed by a local host user and/or remote host user are transmitted to each of the network connected local hosts and remote hosts. For example, if the virtual reality environment is a home environment, any changes to the home environment performed by a certain host, such as, adding a chair to a certain room within the home environment, are transmitted (as dynamic virtual reality data) to the other hosts in network communication with one another. In addition, any changes to the virtual reality environment resulting from these actions, such as adding the chair to a room, are saved by the local host and stored on the local host persistent (i.e., hard drive and not RAM) memory.

When the host acts as a virtual reality active server, the same copy of the virtual reality environment that is run on the host is shared between all connecting clients, including the host operator (local host user) who can also participate in network communication sessions as illustrated in FIG. 11b. This communication network has certain limitations particularly when the number of session participants is large. For example, this type of virtual reality communication network is inefficient with respect to, for example, data transmission speed, due to network connection bandwidth and computational limitations of both server and client computers. This situation is typical for those hosts which act as public virtual reality portals that are remotely accessed by a large number of users.

To address these limitations, the present invention provides a host(s) capable of acting as a virtual reality passive server for a remote host(s). In passive server mode, remote hosts (i.e., users of remote hosts) can access virtual reality environments associated with a certain host regardless if these environments are already in active or non-active status. The remote host establishes network communication via a session server with a local host. As a passive server, the local host sends a copy of the virtual reality environment to the remote host upon request from the remote host. Specifically, the local host sends dynamic data to the remote host. Static data are taken by the client host from a data server after dynamic data were received. After which time, direct network communication between the client host (i.e., remote host) and server host (i.e., local host) is terminated. In other words, such server hosts work much in the same way as typical Web servers that send Web pages to Web browsers installed on remote computers.

The remote host then activates and operates the virtual reality environment in passive client mode, that is, the remote host does not communicate with the local host regarding changes made to the "copied" virtual reality environment. In other words, the remote host operates as if it had just activated one of its own locally stored virtual reality environments. The only difference being that the remote host cannot save any changes made to the virtual reality environment. By definition, permanent changes cannot be made to the virtual reality environment by the host acting in passive client mode. The virtual reality environment is only a temporary copy and thus the remote host cannot permanently store any virtual reality data files associated with this virtual reality environment.

Alternatively, the virtual reality environment can be accessed locally in passive mode. The main difference between local and remote access is that the copy of the virtual reality environment is accessed at the local host and not via the network at a remote host. Thus, the local passive server host in this case acts as a passive client for itself. Again, the local user cannot make any permanent changes to the virtual reality environment, just as a remote user, when the virtual reality environment is accessed in passive client mode.

It should be appreciated that a virtual reality environment can be accessed in passive server mode in a variety of different ways depending on the access restrictions associated with the local host. For example, a remote user can have the right to permanently save the copy of virtual reality environment at its host. In this situation, the remote user essentially owns this copy of the virtual reality environment and can therefore make and save any changes to it. However, the remote user's saved version of the "copied" virtual reality environment is uniquely identified, that is, it has a different network identifier than the original. The identifier is assigned and registered by the remote host user upon modifying the original copy. This situation is analogous to saving some document file from an Internet site onto to a local computer, that is, at a minimum, the network address of the locally saved document is different than that of the original Internet file.

Once the modified copy of the original virtual reality environment is permanently saved, the remote host no longer acts in passive client mode with respect to this virtual reality environment. Instead, the remote host acts as an active or passive server.

It should be appreciated that passively hosted virtual environments cannot be modified by users, including the owners of hosts associated with such environments. However, the owners of passively hosted virtual environments can access such environments both in active mode and passive mode where active mode is utilized to perform virtual reality environment editing.

It should be further appreciated that each remote user who accesses a passively hosted virtual environment obtains its own personal independent copy of the virtual reality environment. Upon access, the remote user generally does not establish network communication sessions with other users within this virtual reality environment. However, a "follow user" mode may be utilized to establish network communication sessions between users who access the passively hosted virtual reality environments as described in detail below.

As previously discussed, a desirable feature of the present invention is to provide users with a computer network system which enables them to establish interactive network sessions such that the user can effectively operate, function and communicate within a variety of different virtual reality environments. In order to effectively establish network communications, the users must be able to effectively locate the users, hosts, virtual reality environments and the like on the network. As previously discussed, hosts and users can be registered and assigned unique identifiers for locating purposes. Registration is performed by the host via its home session server which stores a variety of different information associated with the host and its owner as further discussed above and illustrated in FIG. 2.

With this information, host, user and other related information can be effectively located by utilizing a locating mode or process, such as a visit user home mode or follow user mode. In visit user home mode, the location task is analogous to locating a certain place. With follow user, the location task is analogous to locating a certain place where a certain person currently resides.

Figure 12:
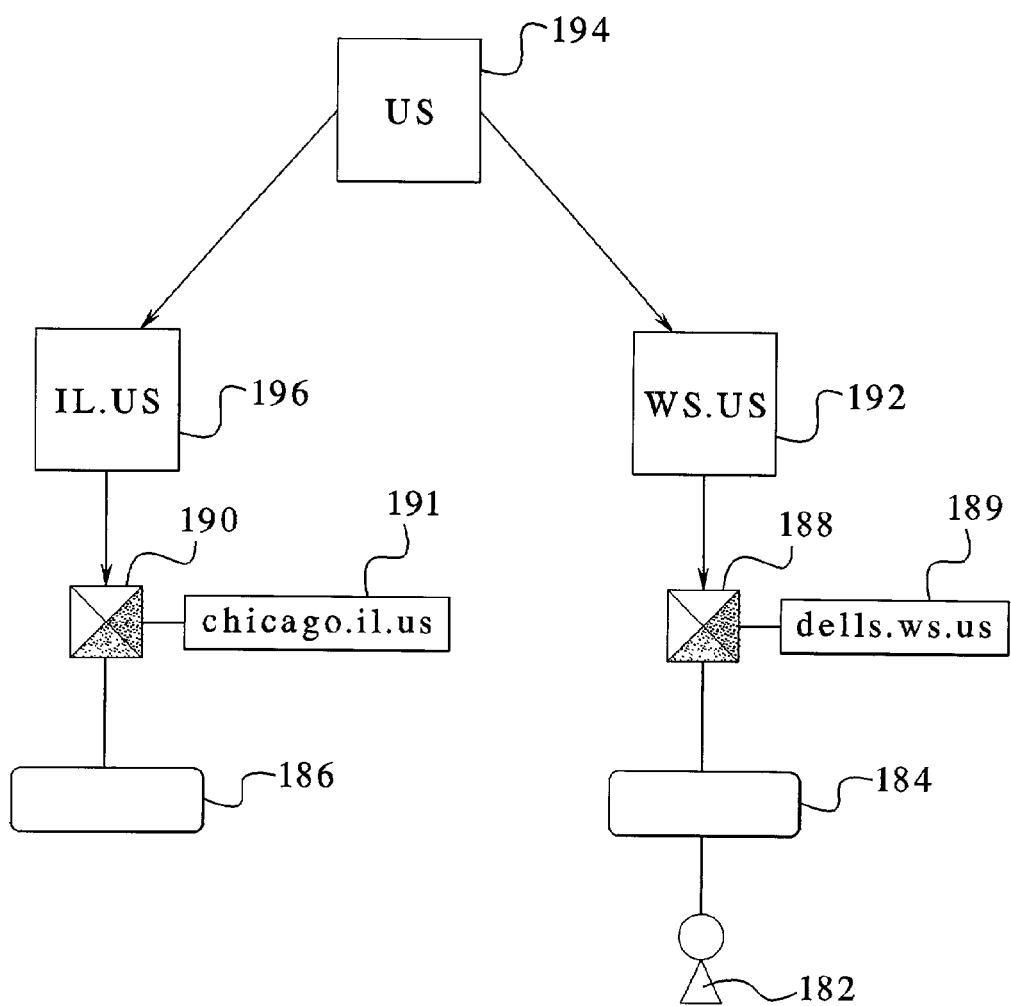
FIG. 12 is a diagrammatic representation illustrating the "Visit User Home" mode of one embodiment of the present invention.

As applied to the present invention, visit user home mode is utilized to find a certain host on the network as described below with reference to FIG. 12. For example, a user 182 who is working at host 184 having host ID (12345678@dells.ws.us) wants to establish a network connection with another host 186 having host ID (87654321@chicago.il.us). The host 184 has a home session server 188 that has a domain name "dells.ws.us" as indicated in box 189. In addition, the other host 186 has home session server 190 with a domain name "chicago.il.us" as indicated in box 191.

To locate this host 186, a request is sent to the home session server 188 from host 184. The request identifies the host 186 to be located by its host ID. The home session server 188 compares the domain name part of the requested host name (i.e., the part of the name following the "@" character) and determines that it is not equal to its own domain name. Thus, it knows that the requested host 186 is not listed in its own database, and therefore, redirects this request to the upper level domain server, such as name server 192 with a domain name "ws.us" as indicated. This server 192 compares its own domain name with the corresponding part of the requested host name, that is, it compares "ws.us" with "il.us".

Because these names are different, the request is redirected to the next upper level domain server, namely, name server 194 with domain name "us" as indicated. At this level, the server domain name ("us") and host domain subname ("us") are equal. The name server 194 attempts to find a server (name or session) within its family of child servers that has the name extension "il," (i.e., the full domain name "il.us"). As shown in FIG. 12, this server is a lower domain level name server 196. The request is redirected to it. The name server 196 performs a similar search and in turn redirects the request to the session server 190 which searches its local database for the host 186 that has the identifier 87654321.

It then reviews this host's status field to determine whether the host is online or off-line. If this host is currently online, it sends the IP address of this host 186 and the IP address of itself back to host 184. With this information, network communication can be established between host 184 and host 186.

The IP address of the host 186 session server 190 can be saved in a local database of host 184, such as in an address book. With this saved information, the host 184 can directly contact the other host 186 without having to make another search request for the host 186 session server IP address. It should be appreciated that the host status can include a variety of different information other than whether it is "online" or "offline." As further illustrated in FIG. 3, the host status field 30 can include whether it has been "redirected" as indicated in box 30a or "moved" (not shown). If redirected, the host 186 has been temporarily moved to another location. If moved, the host 186 has been permanently relocated and assigned to another session server. Thus, the host 184 would need to contact the newly assigned session server to request the actual host status and IP address of the permanently relocated host session server.

Figure 13:
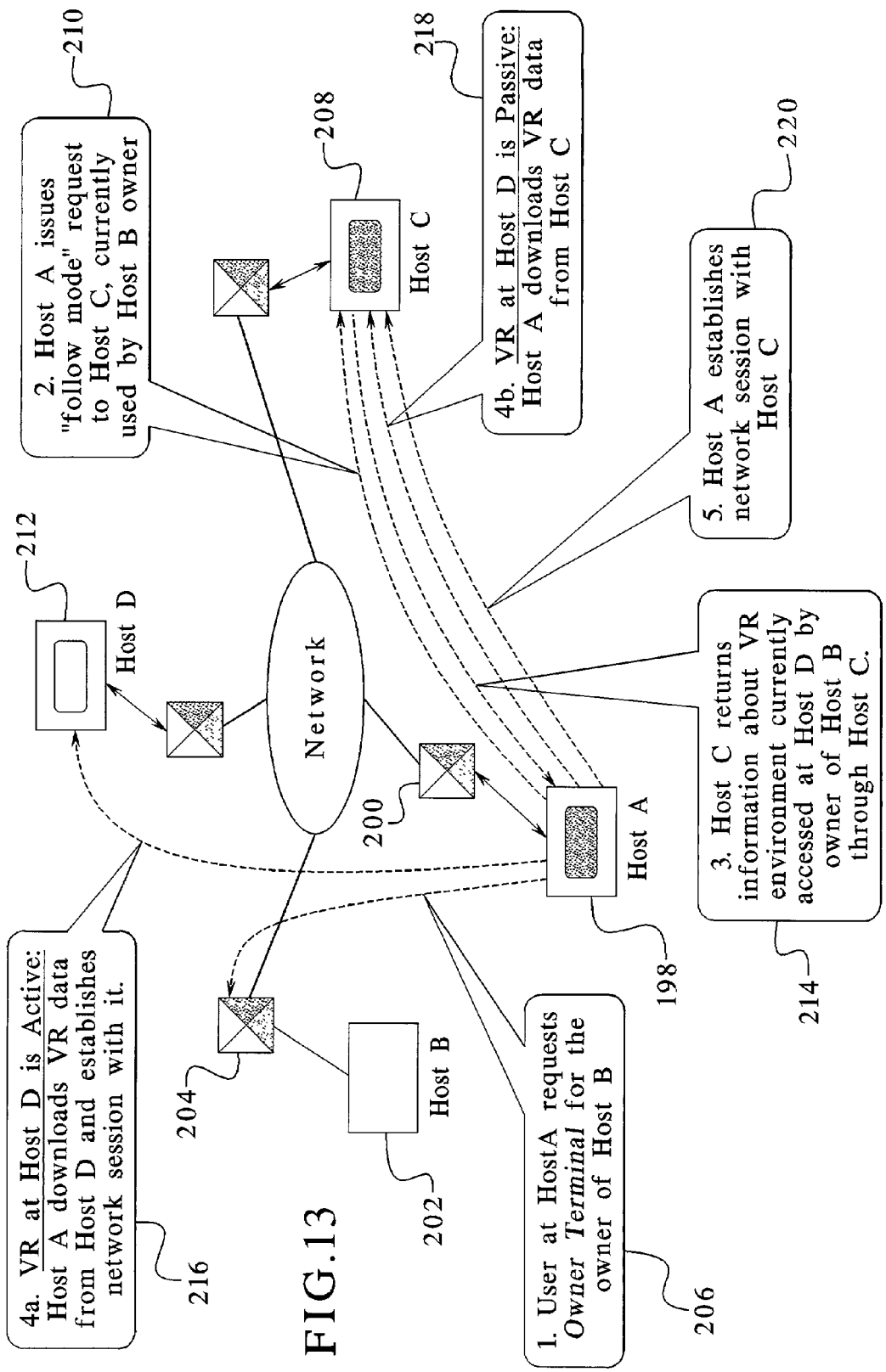
FIG. 13 is diagrammatic representation illustrating the "Follow User" mode of one embodiment of the present invention.

Turning now to FIG. 13, an embodiment of the follow user mode is illustrated. In this example, the user at host 198 (i.e., Host A) wants to establish a network communication with a certain user, namely the owner of the Host B. First, Host A can issue a search request to its session server 200 in order to determine the primary host associated with the home session server of the requested user. This can be done by locating a host which has a host ID that equals the user ID of the requested user (i.e., the user who with network communication is sought). As previously discussed, a host having the same host ID and user ID (owner ID) is a primary host to a user with this user ID.

By locating the primary host 202 (Host B in FIG. 13) and its home session server 204, Host A can request and receive information from the home session server 204 relating to the whereabouts of the requested user as indicated in box 206. This information can be retrieved from the owner terminal field 40 (FIG. 3) of Host B's database record which is stored at session server 204. For purposes of this example, the owner terminal field identifies that the requested user is logged into Host 208 (Host C). Host B's home session server 204 acquired this information when the requested user first logs into Host C. This information was transmitted to Host B's home session server in order to update the owner terminal field in Host B's database record.

With this information, Host A can establish network communications with Host C to further determine how a network communication can be established with the requested user. By establishing network communication with Host C, Host A can issue a follow user mode ("follow mode") request to Host C as indicated in block 210. In follow user mode, Host C can determine, for example, the virtual reality environment and its corresponding host that the requested user is currently accessing. In this example, Host C communicates to Host A that the requested user is currently accessing the virtual reality environment associated with Host 212 (Host D) via Host C as indicated in block 214.

If, for example, the virtual reality environment that the requested user is accessing is run in active mode, Host D acts as an active server in network communication with Host C acting as an active client for Host D. Thus, Host A can establish network communication with Host D in order to interact with the requested user as indicated in block 216.

It should be appreciated that, in this example, the requested user cannot be contacted via a network communication with Host C because Host C is an active client. As previously discussed and further illustrated in FIG. 9a, a host cannot act as both a client and a server for the same virtual reality environment.

If it is assumed, for example, that Host D acts as a passive server as indicated in box 218, Host A must then establish a network communication with Host C in order to interact with the requested user as indicated in box 220. This results because Host D is not in network communication with either Host C or Host A. As previously discussed, a passive server (i.e., Host D) discontinues network communication with passive clients (i.e., Host A and Host C) once a copy of the virtual reality environment is transmitted to the passive clients from the passive server.

By establishing a network connection between Host A and Host C, the server Host D is effectively bypassed. In other words, this situation results in network communication between a group of hosts (i.e., Host A and Host C). This type of network communication is referred to as a symmetric communication channel such that each host of the group can establish a peer-to-peer connection with the other hosts of the group. In this situation, each host contains its own local database which includes the IP address of the other hosts.

Other hosts can join the group of hosts by connecting to one of the hosts of the group, for example, by issuing a follow user mode request as previously discussed. Once connected, the newest host member of the group receives the list of IP addresses of each of the hosts in the group. In turn, the newest member sends its IP address to each of the hosts such that each of their group databases can be updated. This type of network connection continues provided that at least two hosts of the group remain in network communication with one another.

The symmetric communication channel contrasts the situation where network communication between hosts is established through a dedicated or central server. This type of network communication is referred to as asymmetric communication channel. An advantage of the symmetric communication channel is that it is not dependent on a central or dedicated server, that is, this type of network communication exists provided that at least two hosts remain in network connection. However, the asymmetric communication channel ends once the central server terminates the session. This means that the client hosts will no longer have access to the virtual reality environment associated with the dedicated server.

Figure 14:
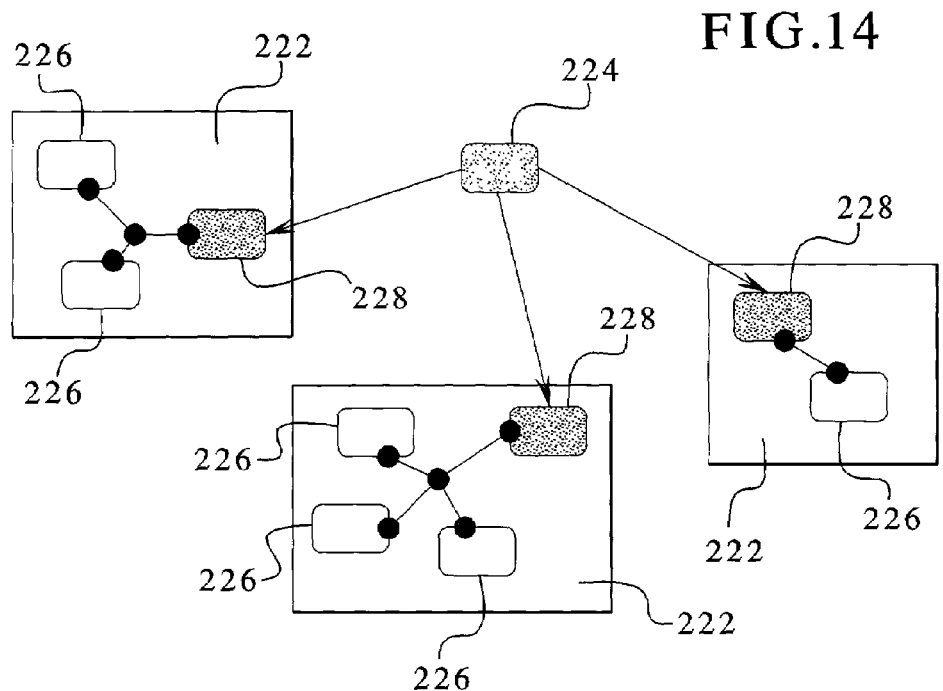
FIG. 14 is diagrammatic representation illustrating symmetric channel communication.

Thus, the symmetric communication channel enables a number of relatively small independent user groups to share different and independent copies of a virtual reality environment. For example, three separate user groups 222 can be established between hosts. These groups 222 each contain a copy of a virtual reality environment received from a server host 224 acting in passive mode as illustrated in FIG. 14. As previously discussed, the network connection exists between the passive client hosts and not between the hosts and server. Each of the groups include at least two host group members 226, including at least one group member 228 who initiated the group (i.e., the group initiator). Other hosts can join the group by executing visit user home and follow user location requests as previously discussed. It should be appreciated that the group initiator can leave the group at any time without interrupting the network communication session between the remaining group members since each user group is completely symmetric relative to its members.

As previously discussed, "visit user home" and "follow user" access modes may be utilized by host users to travel between different virtual reality environments. To facilitate such travel, the present invention provides a method of continuous group teleportation between virtual environments utilizing "visit user home" and "follow user" access methods as described above. The term "continuous" means that the virtual network communication between the group of users is effectively uninterrupted during teleportation. Thus, the group of users may continue to perform certain networked virtual tasks. For example, a user may be able to view the users, namely, the users' avatars, who participate in the group teleportation process, communicate with them, play games and perform other like virtual tasks.

As applied to the present invention, dedicated entry point objects (entry points) and teleportation objects (teleporters) are utilized to facilitate continuous user group teleportation. In general, an entry point is a closed area located within a virtual reality environment, such as a room or booth. The entry point enables a user(s) to position itself (i.e., its user avatar) within a corresponding teleporter. In turn, teleporters are utilized to teleport a user or a group of users to other virtual environments.

Figure 15:
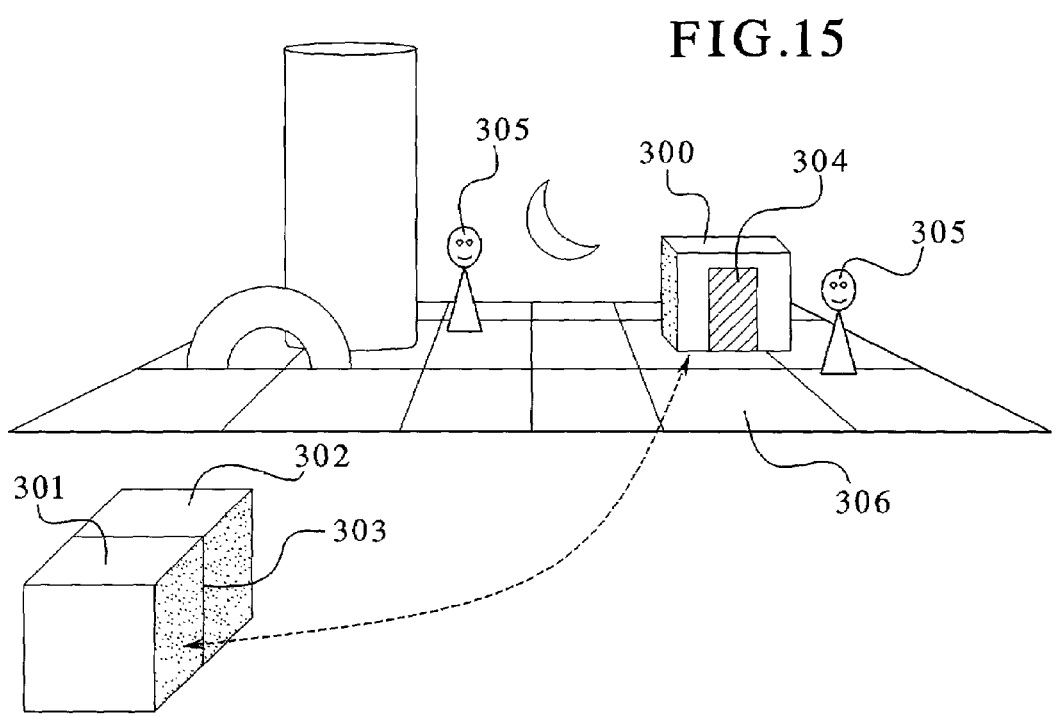
FIG. 15 is a diagrammatic representation illustrating teleportation provided by one embodiment of the present invention.
Figure 15A:
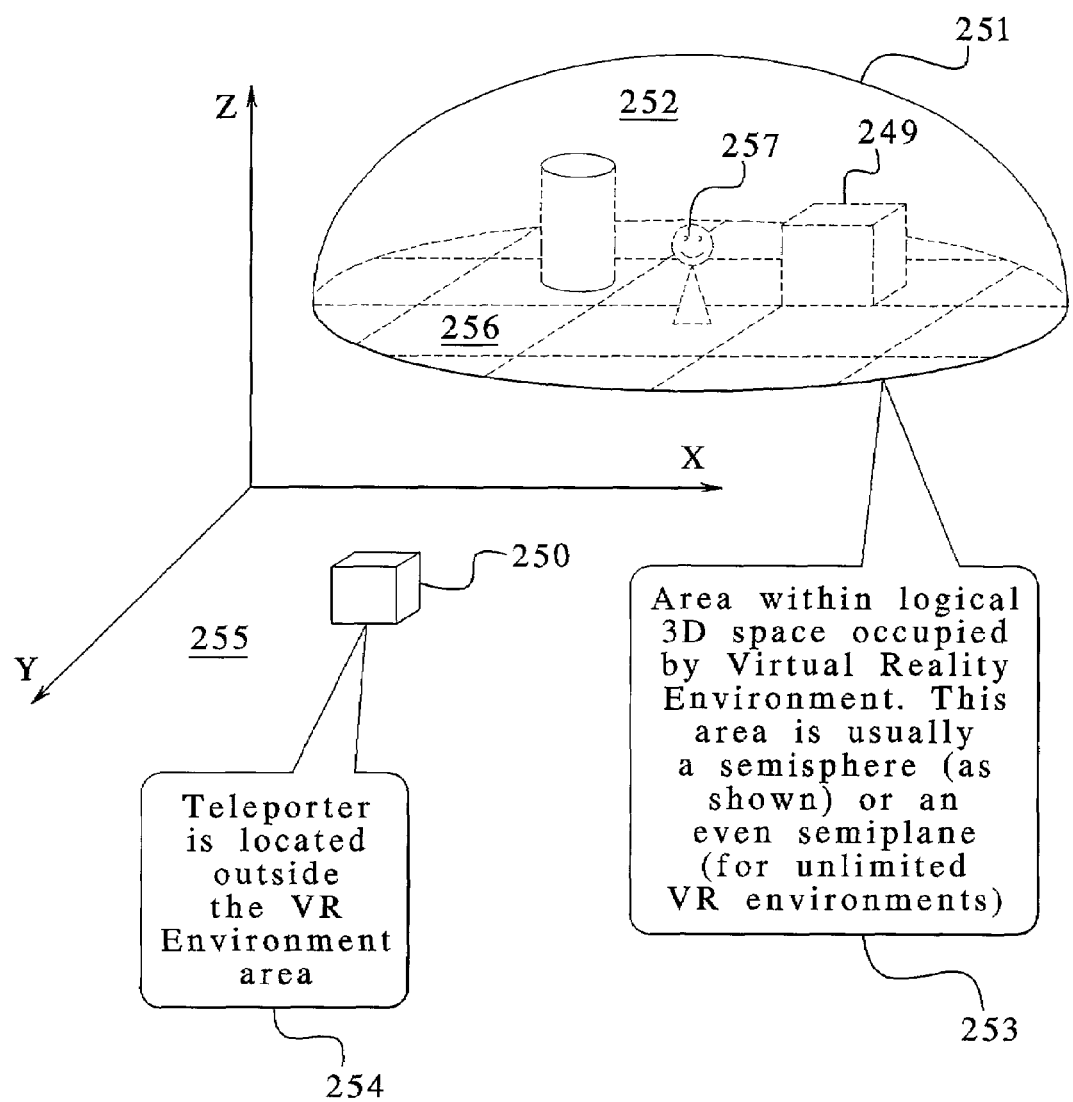
FIG. 15a is a diagrammatic representation illustrating the collocation of the virtual reality environment and teleporter in three dimensional space of one embodiment of the present invention.

Unlike entry points 249, teleporters 250 are located outside the area that is occupied by a virtual reality environment 251 in a single three dimensional coordinate space 252 rendered by the host virtual reality software as illustrated in FIG. 15a and as indicated in box 253 and box 254. The teleporter region 255 is located outside of the virtual environment 251 from which the users are teleported. For example, teleporters 250 may be located beneath the ground surface 256 of the virtual environment 251. In this location, the defined space of the teleporter 250 and that of the virtual environment 251 do not intersect. Thus, the teleporter region 255 is not visible to and cannot be entered by the user(s) 257 from within the virtual environment 251. The teleporter 250 has one or several entry regions upon which entry can be made via adjacent entry point clones as discussed below.

An entry point clone has an identical structure as that of a corresponding entry point object associated with the virtual environment. However, the entry point clone, like the teleporter, is located outside of the virtual environment. When the user moves its avatar into an entry point area associated with the virtual environment, it is instantly moved to a corresponding entry point clone from which the user may further proceed to the teleporter. It should be appreciated that since entry points and their corresponding clones concurrently exist and are kept in active state within identical three dimensional coordinate space, user avatars may be instantly moved between them. A user can move between entry point and an entry point clone with the speed of frame rendering which is typically about 1/30 of a second.

Teleporters are preferably equipped with a teleportation control panel. This provides the users with an interface to perform teleportation operations. The control panel may be utilized to perform a variety of different operations, such as personal address book access, destination preview feature and teleportation progress visual monitoring system. The teleporter can also include a variety of personal objects, such as furniture and the like. The personal objects can be utilized to facilitate virtual communication and interaction within the teleporter.

When a teleportation function is performed, the avatars of all participating users are temporarily locked within the teleporter. This continues until the destination virtual environment, including its entry points and entry point clones, is loaded and activated at each users' host. Thus, teleportation is actually performed in the background mode and does not interrupt the network session between the teleporting users. In other words, all users locked within the teleporter can communicate with each other and interact with other objects located therein.

With the destination virtual reality environment loaded and activated at all participating hosts, teleporters associated with the hosts will be connected to entry points via corresponding entry point clones. Thus, the users can exit the entry points via the entry point clones into the destination virtual environment.

It should be appreciated that teleporters are generally not viewed by users within the virtual environment. Therefore, the teleporters are generally not designed to fit any particular virtual environment which users are teleported to or from. This function is effectively accomplished by the entry point objects which may be designed in many different ways both from inside and outside the virtual environment depending on the particular qualities of each virtual reality environment. Thus, visual compatibility between entry points associated with the destination virtual environment and teleporters is only required along respective adjacent surfaces. This greatly simplifies design requirements which are necessary to achieve compatibility.

Figure 16:
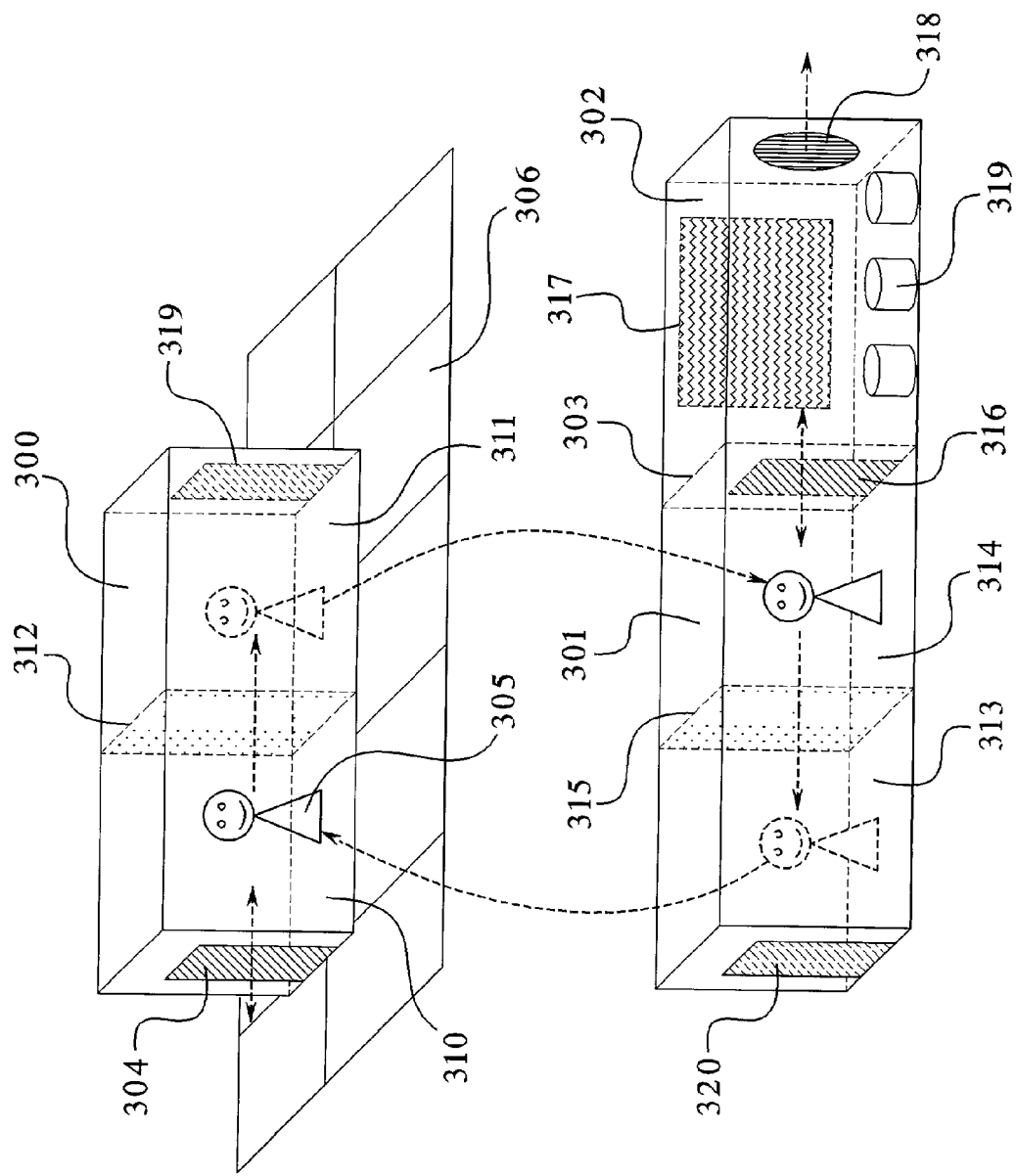
FIG. 16 is a diagrammatic representation of teleportation illustrating virtual travel between an entry point and a clone entry point.

As further illustrated in FIGS. 15 through 17, an embodiment of continuous group teleportation is illustrated. FIG. 15 demonstrates an example of a location of each of an entry point, its clone and a connected teleporter object relative to a virtual reality environment within three dimensional coordinate space. Entry point 300 is located on the virtual environment ground surface 306. Users 305 may enter the entry point object 300 through the door 304. From inside the entry point object 300, a user avatar(s) is moved to a corresponding entry point clone 301 which is located beneath the virtual environment ground surface 306. The entry point clone is geometrically adjacent to a teleporter 302. The user may move the avatar between the entry point clone area and the teleporter area through a door (not shown) located on the region 303 that separates the entry point clone 301 from the teleporter 302.

The details of user avatar movement from an entry point object to its clone and further to a teleporter are illustrated in FIG. 16. Entry point object 300 is divided into two adjacent subareas, namely, neutral area 310 and transfer area 311 which are connected through an invisible surface 312. The corresponding entry point clone 301 exists as an exact copy of the original entry point 300 except that the neutral area and the transfer area are inverted relative to each other. In other words, the neutral area 314 within the clone 301 corresponds to the transfer area 311 within the original entry point 300, and the transfer area 313 of the clone 301 corresponds to the neutral area 310 of the original entry point 300. The area 313 and the area 314 are connected through an invisible surface 315 which has the same coordinate position as the surface 312.

When a user moves its avatar from the neutral area 310 of the original entry point object to the transfer area 311, it is instantly moved to the same coordinate position within the neutral area 314 of the clone. At this stage, the user can move the avatar directly into the teleporter 303 through the door 316 or can return to the neutral area 310 of the entry point object 300 by moving the avatar to the transfer area 313 of the clone. To provide the same interior look of the entry point object 300 and it's clone 301, the visual images of the door 319 and the door 320 are added to each object. It should be appreciated that the user's avatar does not reach these doors since it is instantly transferred to a conjugate object whenever it tries to approach them from the neutral area. As also illustrated in FIG. 16, the teleporter object 302 is equipped with a teleportation control panel object 317, an emergency exit 318 and other optional objects 319.

The emergency exit 318 may be utilized by users to leave the teleporter after teleportation has started. This may be necessary, for example, when a particular user decides not to be teleported or when a user's host has a faulty network connection which would make it impossible for other users in the group to accomplish the teleportation process. When a user leaves the teleporter area through the emergency exit, the network connection between its host and the hosts of the other users participating in group teleportation is interrupted. The user avatar is moved to a pre-defined system emergency teleportation capsule (not shown). This area is similar to a regular teleporter, although it only includes a teleportation control panel inside. It should be appreciated that group teleportation via emergency teleportation capsules is impossible since each user that passes through an emergency exit obtains his own personal copy of the capsule.

Figures 18A, 18B, 18C:

The teleportation control panel 317 is utilized for the selection of a destination virtual reality environment and teleportation process control. The layout of the teleportation control panel is further illustrated in FIG. 17. The control panel can include a display screen 330 and control buttons 331 to 341. The button 331 and button 332 are used to display a list of respective places and people from a user's personal address book as shown in FIGS. 18a and 18b. The user can select a place or person from the list 351 or enter it manually in the field 352. By selecting a place, the user instructs the system to perform teleportation in "visit user home" mode. By selecting a person, the user instructs the system to perform teleportation in "follow user" mode.

When a place or a person is selected, the informational page associated with the destination virtual environment is displayed on the screen as shown in FIG. 18c. The page contains general information about the destination virtual reality environment. This information is downloaded from the home session server of the host at which the destination virtual environment is stored. Informational pages are preferably stored in XML or other analogous data format. Thus, these pages are similar to conventional Web pages.

Since informational pages are stored on the session servers, they are available to users, regardless of whether the corresponding host is online or offline. The virtual reality environment informational page can include a variety of different information. It preferably contains a description 361, a list of available entry points 362, an availability status (i.e., open or closed) 363 and other like data. A general information view of the destination virtual reality environment may be selected by pressing the "Info" button 333. Pan scrolling of the information page content can be conducted via a set of buttons 338.

Before teleporting to the selected virtual reality environment, a user may specify an entry point corresponding to the destination virtual environment. The desired entry point may be selected from the list 362 of entry points that are available on the general information page. Another entry point selection method is provided via an interactive map as shown in FIG. 18d. The map view may be selected on the control panel screen 330 by pressing the "Map" button 334. A standard set of zoom control (335a and 335) and pan scrolling (338) functions are provided. If the user does not specify an entry point, a default (main) entry point is selected automatically by the system.

As illustrated in FIG. 18d, a virtual reality environment map indicates the locations of all available entry points 371, locked entry points 372, main entry points 373 and other like information. It can also indicate the current location of the user avatar 374 within the virtual environment if a "follow user" teleportation method was selected by the user as discussed above.

By pressing the "Preview" button 336 (FIG. 17), the user may switch to a panoramic screenshot of the destination virtual reality environment (FIG. 18e) as it is seen from a selected (or main by default) entry point through a virtual video camera located on top of it. Pan scrolling buttons 338 are used to rotate the virtual camera around its axis. It should be appreciated that the panoramic view feature does not require the destination virtual environment to be loaded and activated on a user's host since it is only a small-size static 360-degree screenshot of the three dimensional scene taken from the entry point position.

Buttons 339 through 341 are used for teleportation control. The "Lock/Unlock" button 339 is used to close and/or open doors 316 (FIG. 16) into a teleportation area. This restricts access of other users into it. The "Start/Stop" button 341 starts and/or stops the teleportation process. The "Return" button 340 can be utilized to return to the virtual reality environment from where teleportation was initiated.

After a user has pressed the "Start/Stop" button 341, the control panel screen 330 will be switched to the teleportation progress display mode as shown in FIG. 18f. This display mode may be selected at any time by depressing the "Progress" button 337.

It should be appreciated that a teleportation control panel may be used by one user at a time. However, all other users participating in group teleportation may watch certain actions performed by the user currently working with the panel. Visibility of each display mode by other users may be changed by the user currently working with the panel by pressing the "Options" button 342 (FIG. 17) and selecting an appropriate visibility settings (not shown). The help button 343 (FIG. 17) can be utilized to provide a set of instructions relating to the teleportation process.

After moving a user avatar into the teleporter, a user may capture and activate the teleportation control panel object. This can be done by a variety of different ways, preferably by double clicking the mouse button over it. Once captured, the teleportation control panel object automatically moves the user avatar towards it and places the avatar in front of the panel so the user may see the panel in full screen. The panel object remains locked with respect to use by the other users entering the teleportation area, that is, the other users are not allowed to capture the panel unless the panel is released. The user who currently operates the panel may release it by a variety of ways, preferably by double clicking the mouse button at any point outside the panel.

Figure 19A:
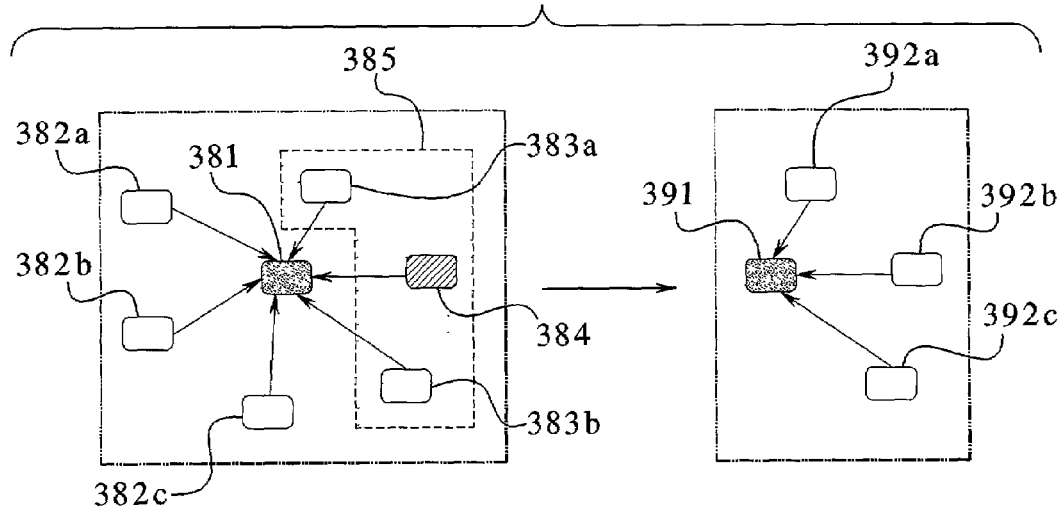
FIGS. 19a, 19b and 19c are diagrammatic representations illustrating host network communication during group teleportation.
Figure 19B:
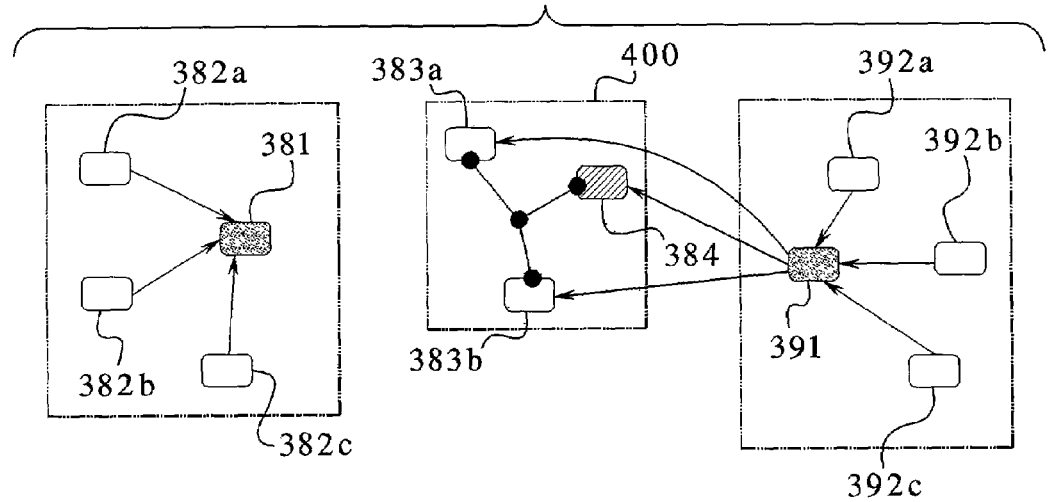
Figure 19C:
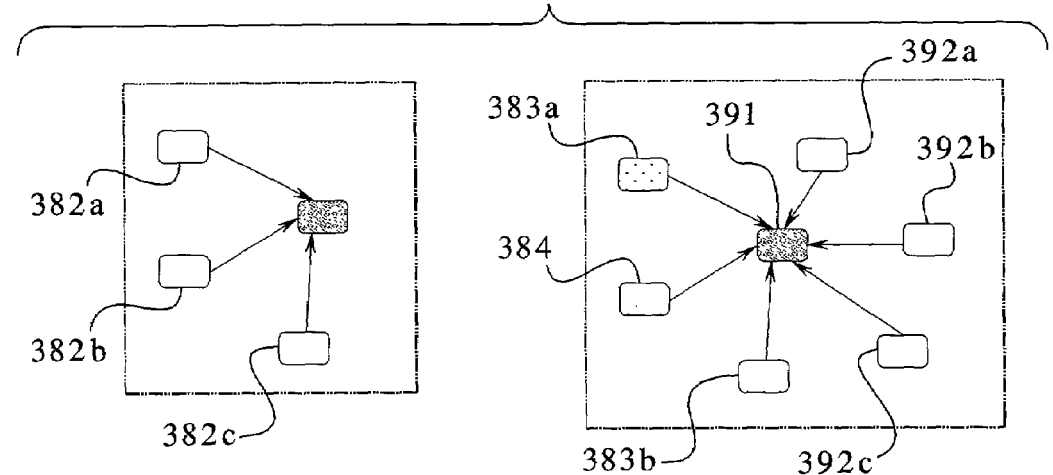

An embodiment of the network dynamics associated with group teleportation is shown in FIGS. 19a, 19b and 19c. In this example, it is assumed that the departure virtual environment and the destination virtual environment are hosted in active server mode. Turning to FIG. 19a, the departure virtual reality environment is stored at the server host 381 and accessed by users at the remote client host 382a, the remote client host 382b, the remote client host 382c, the remote client host 383a, the remote client host 383b and the remote client host 384. Thus, the host 381, the remote client host 382a, the remote client host 382b, the remote client host 382c, the remote client host 383a, the remote client host 383b and the remote client host 384 establish a network session via an asymmetric communication channel.

Similarly, the destination virtual reality environment is stored at the server host 391 and accessed by users at the remote client host 392a, the remote client host 392b and the remote client host 392c. The users of host 383a, host 383b and host 384 form the group 385. This group 385 is to be teleported to the destination virtual environment such that the user avatars are located inside the teleportation object. Furthermore, the user at host 384 operates the teleportation control panel. In other words, the host 384 acts as an initiator of the teleportation process.

When a user of host 384 initiates the teleportation procedure (by pressing "Start/Stop" button 341 FIG. 17), client host 383a, client host 383b and client host 384 are disconnected from the server host 381 to form an independent group 400 as it is further illustrated in FIG. 19b. This establishes a network session between each of the users of the group via a symmetric communication channel. In this example, host 384 acts as group initiator. It should be appreciated that any host may leave the group at any time without interrupting the network connection between the remaining other hosts since host 383a, host 383b and host 384 are interconnected via a symmetric network scheme. As previously discussed, the host user may leave the group by utilizing an emergency exit.

After the user group 400 is created, host 383a, host 383b and host 384 issue a request to download data associated with the destination virtual reality environment. Dynamic data is downloaded from the server host 391. Static data is downloaded from a corresponding data server (not shown). Furthermore, host 384 sends to the server host 391 a notification message to lock the entry point selected at the destination environment by the user of host 384 such that it cannot be used for teleportation by another host or group of hosts during this time. As long as the required data is downloaded to the hosts, the hosts can continue to exchange download progress messages between each other which are displayed on the control panel screen as shown in FIG. 18f.

FIG. 19c illustrates the situation when a download of destination virtual reality data to the host 383a, host 383b and host 384 is complete. At this moment, the host 383a, host 383b and host 384 are connected to the server host 391 as its clients. The entry point object at the destination virtual environment is unlocked and, thus, the users may move their avatars into the destination virtual environment.

As described above, each virtual reality environment may have an associated informational page located on the session server of the host, at which this virtual reality environment is stored. The owner of the host will submit virtual environment informational pages to the host's session server if it is made available for remote access from other hosts. Informational pages are submitted to session servers in XML or other analogous data format, and are similar to conventional Web pages.

Each virtual environment informational page, as in a regular Web page, preferably contains meta-informational tags, which may be used by various Web search engines for page data classification purposes. Such meta tags usually contain brief page description and the list of associated keywords. When the Web page is submitted to a search engine, this meta-information and page contents are used to properly position and index it in a search engine database. Upon a user page search request to a search engine, the search engine looks up its database and responds with the list of relevant web pages.

One problem with the existing Web search engines is that there is a number of them existing on the Internet and typically owners of web sites need to submit their web pages to practically all of them to make sure their web sites could be found by various users, which may prefer using different search engines. This may become a very time consuming process without usage of special tools, which automate web page submission. Such tools are typically implemented as stand-alone programs, containing relatively large database of existing search engines. Each record within such database contains search engine submission page URL along with data submission form, which should be used for online to submission of a web page to a particular search engine. It should be appreciated that since both submission page URL and submission form data format may be changed by search engine developers at any time, the success of automated web page submission process with the help of any tool of described type in general can not be guaranteed, because its database is not guaranteed to have the correct data at any given time.

Another problem with existing search engines is that they don't guarantee that submitted web page information will be stored permanently in the search engine database and also may produce incorrect search results. This problem originates from the fact that search engines usually collect information from the web sites around the world or relatively large geographical domains and thus their databases may potentially grow to an enormous number of records, which in turn may not all contain correct information due to constant changes of existing web sites contents and structure. To keep their databases consistent, search engines must periodically perform clean up procedures in order to remove broken or outdated links and free disk space for new web page submissions. This in turn, results in the third major problem of existing search engines, which manifests as a requirement for web site operators to continuously resubmit web pages to search engines on a regular basis in order to keep them from being swapped out from search engine databases by clean up procedures. It should be appreciated that such resubmission procedure must be performed by web site operators regardless of whether their web site contents were changed.

The present invention solves the above problems by providing a distributed network data search system which facilitates a virtual environment informational pages submission process and provides high level of search data integrity. In addition, such a system does not require an extremely high computational power of software and hardware resources, which is typically needed to provide an acceptable performance of a centrally hosted data search engine.

According to the present invention, each session server is equipped with the data search engine software, which is used for submitting informational pages of virtual reality environments, storing and indexing submitted informational pages in its page search database and serving page search requests from hosts. It should be appreciated, that if a host owner needs to submit an informational page which describes a virtual environment stored at the host, this page should be submitted only to the home session servers of that host. Thus, each session server may only contain search information about virtual reality environments stored at hosts, which have it assigned as a home session server.

The information about the virtual reality environment is stored on the session server unless this environment is removed from the host by the host owner, or host idle time limit is expired, as described above with regard to removal of idle host virtual reality static data from it's home data servers.

Handling of a user page search request is a distributed process which utilizes the name and session servers network infrastructure and, depending on the request scope, may spread among all name and session servers on the network or only activate part of them. As discussed above, name and session servers are interconnected with each other according to their domain names and form a tree-like hierarchy. The process of retrieving search results includes traversing the tree of name and session servers and sending search results from session servers back to a requesting host unless all name and session servers are traversed.

When a host user issues a page search request to the network, it may specify the search scope. The search scope is identified by the domain name of the name or session server, which will be considered the top server of the search subtree. If the search scope was not specified by the host, the root name sever will be considered as the top server. It should be also appreciated that a host may specify a plurality of domain names as a search scope and thus a page search will be conducted in several subtrees of an entire network.

Figure 20:
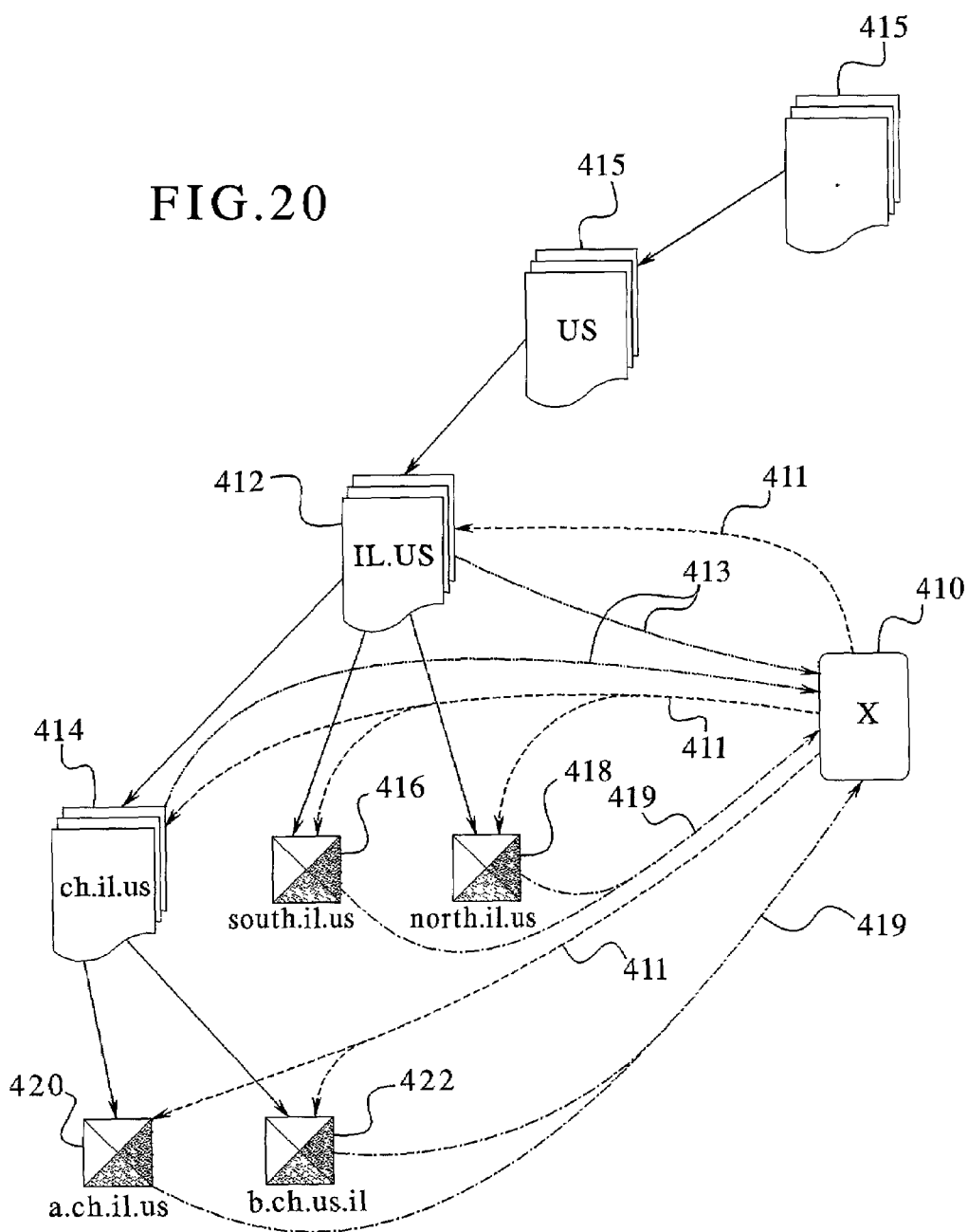
FIG. 20 is a diagrammatic representation of the Host page search request illustration.

An example of such a distributed search process is illustrated on FIG. 20, where host X 410 issues page search request 411 to the name server IL.US 412, specifying it as the top name server associated with the search tree including the hierarchical network of name servers 415. Since the server IL.US 412 is a name server, it cannot return any search results back to the host 410, and responds 413 with the list of IP addresses of its three child servers CH.IL.US 414, SOUTH.IL.US 416 and NORTH.IL.US 418. Having the IP addresses of these servers, host X 410 disconnects from IL.US 412 and reissues its request 411 to all IL.US child servers. As illustrated in FIG. 20, server CH.IL.US 414 is the name server of the lower level of server hierarchy. Upon a host's page search request to server CH.IL.US 414, this name server responds 413 with the list of its own child servers A.CH.IL.US 420 and B.CH.IL.US 422, while SOUTH.IL.US 416 and NORTH.IL.US 418 servers are the session servers, which actually send 419 their page search results back to the host 410. When the host 410 has received the IP addresses of A.CH.IL.US 420 and B.CH.IL.US 422 session servers, it similarly sends them the same page search request 411 and waits for them to send 419 their search results. The results received by the host 410 from all session servers within a specified subtree are grouped and sorted by their relevancy to a search request and displayed to the host user.

It should be appreciated that all single requests to the name and session servers may be initiated by host asynchronously and parallel to each other. In other words, a host should not wait, for example, for the results of a page search request from the servers SOUTH.IL.US 416 and NORTH.IL.US 418 before it can send the request to, for example, session servers A.CH.IL.US 420 and B.CH.IL.US 422. The only limitation applied is the maximum number of TCP connections the host can concurrently support. To overcome this issue, the host should put all requests to be sent into a dedicated page request queue if the maximum number of TCP connections is reached. As soon as a TCP connection is closed and released by one of the servers, the host checks the queue and, if it is not empty, retrieves and sends the first awaiting page search request from the queue to the name or session server indicated in the request.

It will be understood that modifications and variations may be effected without departing from the scope of the novel concepts of the present invention, and it is understood that this application is to be limited only by the scope of the appended claims.

The invention is hereby claimed as follows:

1. A networked computer system for enabling a plurality of users to access a virtual reality environment and interact in the virtual reality environment, the system comprising:

data representing the virtual reality environment including static virtual reality data and dynamic virtual reality data wherein the static virtual reality data is object information representing virtual reality objects wherein the object information of the static virtual reality data represents any one of a three-dimensional model, a graphic texture, a sound, a program module or a script wherein the dynamic virtual reality data represents parameter values of exemplars of the virtual reality objects within the virtual reality environment wherein the parameter values represent geometric coordinates and describe a state of the exemplars of the virtual reality objects within the virtual reality environment;

a server host receiving and storing the data representing the virtual reality environment wherein the server host changes, stores and transmits the dynamic virtual reality data representing the virtual reality environment wherein a host name of the server host has been assigned to the server host wherein the host name of the server host represents a network location of the server host wherein the server host is accessible via the host name of the server host;

a plurality of servers storing and transmitting the data representing the virtual reality environment and data representing the location of the server host wherein the data representing the network location of the server host identifies a network address of the server host wherein at least one of the plurality of servers communicates with the server host; and a client host communicating with at least one of the plurality of servers wherein the client host obtains the data representing the location of the server host from at least one of the plurality of servers to establish network communication with the server host wherein the client host requests and receives the network address of the server host from one of the servers by providing the host name representing the network location of the server host wherein the client host connects to the server host via the network address of the server and receives the dynamic virtual reality data from the server host wherein the client host identifies the static virtual reality data of the virtual reality environment from the dynamic virtual reality data received from the server host wherein the client host requests and receives the static virtual reality data from one of the servers to access the virtual reality environment wherein the client host activates the virtual reality environment with the dynamic virtual reality data and the static virtual reality data.

2. The system of claim 1 wherein at least one of the servers is a data server which stores static virtual reality data and transmits the static virtual reality data to the client host.

3. The system of claim 1 wherein the plurality of servers has a plurality of session servers which store and transmit host informational data associated with the server host and the client host wherein the client host and the server host are located via the host informational data.

4. The system of claim 3 wherein each of the session servers has a database which stores the host informational data wherein the server host accesses the host informational data via at least one of the plurality of servers.

5. The system of claim 1 wherein the plurality of servers has a plurality of name servers which store and transmit server informational data associated with the plurality of session servers and a plurality of data server wherein the client host accesses the server informational data via at least one of the plurality of servers.

6. The system of claim 5 wherein the server informational data identifies a session server name of at least one of the plurality of session servers, a session server IP address of at least one of the plurality of session servers or a session server status of at least one of the plurality of session servers.

7. The system of claim 1 further comprising:
means for assigning access restrictions to the server host wherein the access restrictions prevent the client host from communicating with the server host.

8. The system of claim 1 further comprising:
means for registering the host with at least one of a plurality of session servers wherein the host is identified from the registration data provided by the host to the session server during host registration and stored at the session server as a part of host informational data.

9. The system of claim 1 wherein the virtual reality environment is activated in an active mode between the client host and the server host wherein the dynamic virtual reality data is modified by the client host and transmitted to the server host.

10. The system of claim 9 wherein the client host and the server host establish a continuous network communication which facilitates interaction within the virtual reality environment between the server host and the client host.

11. The system of claim 9 wherein the dynamic virtual reality data is communicated between the server host and the client host wherein the server host and the client host modify the virtual reality environment.

12. The system of claim 11 wherein the server host simultaneously functions as a server host and a client host relative to a plurality of different virtual reality environments.

13. The system of claim 1 wherein the virtual reality environment is activated in a passive mode between the client host and the server host wherein the passive mode prevents the client host from modifying the dynamic virtual reality data at the server host.

14. The system of claim 13 wherein the server host transmits a copy of the virtual reality environment to the client host wherein the client host stores the copy of the virtual reality environment.

15. The system of claim 14 further comprising:
a network communication between the client host and the server host which is discontinued after the copy of the virtual reality environment was transmitted to the client host.

16. A method for users to interact within a virtual reality environment, the method comprising the steps of:
providing a plurality of hosts which are connected to a network wherein each of the plurality of hosts are accessed via the network wherein a host name is assigned to each of the plurality of hosts wherein the host name of each of the plurality of hosts identifies a network location of each of the plurality of hosts;
providing a plurality servers interconnected with the plurality of hosts wherein at least one of the plurality of servers stores and transmits host informational data, dynamic virtual reality data and static virtual reality data to each of the plurality of hosts via the network wherein the static virtual reality data is object information representing virtual reality objects wherein the object information of the static virtual reality data represents any one of a three-dimensional model, a graphic texture, a sound, a program module or a script wherein the dynamic virtual reality data represents parameter values of exemplars of the virtual reality objects within the virtual reality environment wherein the parameter values represent geometric coordinates and describe a state of the exemplars of the virtual reality objects within the virtual reality environment wherein the host informational data identifies the host name assigned to each of the plurality of hosts;
identifying the location of each of the plurality of hosts via the host name assigned to each of the plurality of hosts wherein by the host informational data is accessed with at least one of the plurality of servers to determine the network location of each of the plurality of hosts; and
establishing a network communication between a server host and a client host of the plurality of hosts via the network wherein the server host stores the dynamic virtual reality data wherein the server host is a server to the client host wherein the client host is a client to the server host wherein the server host transmits the dynamic virtual reality data to the client host wherein the client host accesses the dynamic virtual reality data received from the server host and obtains the static virtual reality data which corresponds to the dynamic virtual reality data received from the server host from at least one of the plurality of servers.

17. The method of claim 16 further comprising the step of:
performing a plurality of computer applications within the virtual reality environment wherein the client host executes at least one of the plurality of computer applications within the virtual reality environment.

18. The method of claim 16 further comprising the step of:
creating and customizing a personal virtual reality environment wherein the server host modifies the dynamic virtual reality data to represent the personal virtual reality environment.

19. The method of claim 18 wherein the personal virtual reality environment is a home or business environment wherein the personal virtual reality environment is accessible via the client host.

20. The method of claim 16 further comprising the step of:
establishing the network communication between the users within the virtual reality environment via the network wherein the users interact via the plurality of hosts.

21. The method of claim 16 further comprising the step of:
identifying the network location of hosts temporarily redirected via dynamic host roaming wherein the host informational data of a redirected host is additionally stored at a roaming session server wherein the host informational data stored at a host home session server has a network address of the roaming session server.

22. The method of claim 16 further comprising the step of:
identifying the network location of hosts permanently moved via host name aliasing wherein the host informational data of a moved host is relocated to a host new home session server wherein the host informational data stored at a host old home session server has a network address of the new home session server.

23. The method of claim 16 further comprising the step of:
locating the server host in a follow user mode wherein the location of the server host is altered in the follow user mode wherein the server host name is identified by the name of the server host which a followed user is currently connected to from a client host.

24. The method of claim 16 further comprising the step of:
locating the server host in a visit user home mode wherein the location of the server host is identified by the host name.

25. The method of claim 16 further comprising the step of:
establishing the network communication by multi-cast messaging wherein one of the plurality of servers communicates with the two or more of the plurality of hosts via the multi-cast messaging.

26. The method of claim 16 further comprising the step of:
establishing the network communication by uni-cast messaging wherein each of the plurality of servers communicates with one of the plurality of hosts.

27. The method of claim 16 wherein the client host accesses the virtual reality environment hosted at the server host in an active mode wherein the dynamic virtual reality data modified by the client host is transmitted over to and permanently stored at the server host.

28. The method of claim 16 wherein the client host accesses the virtual reality environment hosted at the server host in a passive mode wherein the dynamic virtual reality data modified by the client host is not transmitted over to and kept unchangeable at the server host.

29. The method of claim 16 further comprising the step of:
registering the plurality of hosts and host owners with at least one of a plurality of session servers wherein the host informational data is identified by registering the plurality of hosts and host owners.

* * * * *

UNITED STATES PATENT AND TRADEMARK OFFICE
CERTIFICATE OF CORRECTION

PATENT NO. : 7,269,632 B2 Page 1 of 1
APPLICATION NO. : 09/874022
DATED : September 11, 2007
INVENTOR(S) : Edecker et al.

It is certified that error appears in the above-identified patent and that said Letters Patent is hereby corrected as shown below:

Column 9, line 49:
- replace "block 210" with --block 21b-- to read "callout 7 of block 21b"

Regarding Claim 16:
- in line 9, insert --of-- between "plurality" and "servers" to read "plurality of servers"
- in line 29, delete "by" to read "wherein the host informational data"

Signed and Sealed this

Third Day of June, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,269,632 B2 | Page 1 of 1 |
| APPLICATION NO. | : 09/874022 | |
| DATED | : September 11, 2007 | |
| INVENTOR(S) | : Edecker et al. | |

It is certified that error appears in the above-identified patent and that said Letters Patent is hereby corrected as shown below:

ON THE TITLE PAGE,

Item [12], replace "Edeker" with --Edecker--.

Item [75], Inventor, replace "Edeker" with --Edecker--.

Signed and Sealed this
Twenty-seventh Day of September, 2011

David J. Kappos
*Director of the United States Patent and Trademark Office*